US012567139B2

(12) United States Patent
Ikeda et al.

(10) Patent No.: US 12,567,139 B2
(45) Date of Patent: Mar. 3, 2026

(54) APPEARANCE INSPECTION APPARATUS AND APPEARANCE INSPECTION METHOD FOR ELECTRONIC CIRCUIT BOARDS

(71) Applicant: Mitsubishi Electric Corporation, Tokyo (JP)

(72) Inventors: Yuichi Ikeda, Tokyo (JP); Yotaro Nakane, Tokyo (JP); Akira Minezawa, Tokyo (JP); Kohei Okahara, Tokyo (JP); Yukihiro Toku, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 381 days.

(21) Appl. No.: 17/996,018

(22) PCT Filed: Apr. 28, 2020

(86) PCT No.: PCT/JP2020/018187
§ 371 (c)(1),
(2) Date: Oct. 12, 2022

(87) PCT Pub. No.: WO2021/220437
PCT Pub. Date: Nov. 4, 2021

(65) Prior Publication Data
US 2023/0196548 A1    Jun. 22, 2023

(51) Int. Cl.
*G06T 7/00*        (2017.01)
*G06T 3/02*        (2024.01)
(Continued)

(52) U.S. Cl.
CPC .............. *G06T 7/001* (2013.01); *G06T 3/02* (2024.01); *G06T 5/50* (2013.01); *G06T 7/11* (2017.01);
(Continued)

(58) Field of Classification Search
CPC .. G06T 7/001; G06T 3/02; G06T 5/50; G06T 7/11; G06T 7/70; G06T 2207/20221;
(Continued)

(56) References Cited

U.S. PATENT DOCUMENTS

| | | | |
|---|---|---|---|
| 5,440,566 A * | 8/1995 | Spence ................ | G01R 31/309 356/73 |
| 7,869,644 B2 | 1/2011 | Murakami et al. | |

(Continued)

FOREIGN PATENT DOCUMENTS

| | | | | |
|---|---|---|---|---|
| CN | 107389701 A | * | 11/2017 | |
| DE | 102014114506 A1 | * | 4/2016 | ......... G01B 11/2513 |

(Continued)

OTHER PUBLICATIONS

F. Raihan and W. Ce, "PCB defect detection Using Opencv with image subtraction method," 2017 International Conference on Information Management and Technology (ICIMTech), Special Region of Yogyakarta, Indonesia, 2017, pp. 204-209, doi: 10.1109/ICIMTech. 2017.8273538. (Year: 2017).*

(Continued)

*Primary Examiner* — Henok Shiferaw
*Assistant Examiner* — Toluwani Mary-Jane Ijaseun
(74) *Attorney, Agent, or Firm* — Buchanan Ingersoll & Rooney PC

(57) ABSTRACT

An appearance inspection apparatus includes an imaging unit, a reconstructed image generation unit, and an image comparison unit. The imaging unit images an object. The reconstructed image generation unit generates a reconstructed image by using a model, the reconstructed image being an image to be obtained by reconstruction of an input image, image data on the object imaged by the imaging unit being used as the input image, the model being used for attempting to reproduce the image data. The image com- (Continued)

parison unit generates a difference image corresponding to a difference between the input image and the reconstructed image.

14 Claims, 15 Drawing Sheets

(51) Int. Cl.
| | |
|---|---|
| *G06T 5/50* | (2006.01) |
| *G06T 7/11* | (2017.01) |
| *G06T 7/70* | (2017.01) |
| *G06V 10/75* | (2022.01) |

(52) U.S. Cl.
CPC .............. *G06T 7/70* (2017.01); *G06V 10/751* (2022.01); *G06V 10/758* (2022.01); *G06T 2207/20221* (2013.01); *G06T 2207/20224* (2013.01); *G06T 2207/30141* (2013.01)

(58) Field of Classification Search
CPC . G06T 2207/20224; G06T 2207/30141; G06T 2207/20084; G06T 2207/20081; G06T 7/0004; G06T 2207/30108; G06T 3/147; G06T 7/0014; G06T 3/4046; G06V 10/751; G06V 10/758; G06V 2201/06; G01N 21/88
USPC ................................................ 382/149, 382
See application file for complete search history.

(56) References Cited

U.S. PATENT DOCUMENTS

| | | | |
|---|---|---|---|
| 11,386,549 B2 | 7/2022 | Miyazawa et al. | |
| 2006/0018531 A1 | 1/2006 | Murakami et al. | |
| 2019/0172190 A1* | 6/2019 | Liu | G01N 21/956 |
| 2019/0200494 A1* | 6/2019 | Kim | B41F 33/0036 |
| 2020/0005070 A1* | 1/2020 | Ambikapathi | G06F 18/2413 |
| 2020/0111204 A1* | 4/2020 | Cosatto | G06F 18/211 |
| 2021/0004945 A1* | 1/2021 | Li | G06T 5/77 |
| 2021/0012476 A1 | 1/2021 | Miyazawa et al. | |
| 2021/0295485 A1 | 9/2021 | Miyazawa | |
| 2022/0261974 A1* | 8/2022 | Matsuda | G06T 5/50 |
| 2023/0153989 A1* | 5/2023 | Ryan | G06T 7/001 |
| | | | 382/149 |

FOREIGN PATENT DOCUMENTS

| | | | | | |
|---|---|---|---|---|---|
| JP | H0535848 A | | 2/1993 | | |
| JP | 2002022421 A | * | 1/2002 | | |
| JP | 2003092500 A | | 3/2003 | | |
| JP | 2006058284 A | | 3/2006 | | |
| JP | 6693684 B2 | | 5/2020 | | |
| KR | 20190042384 A | * | 4/2019 | ......... | G01N 21/8851 |
| WO | 2018105028 A1 | | 6/2018 | | |
| WO | 2019186915 A1 | | 10/2019 | | |
| WO | WO-2019233166 A1 | * | 12/2019 | .......... | G06T 7/0004 |
| WO | WO-2024195159 A1 | * | 9/2024 | .............. | G06T 7/00 |

OTHER PUBLICATIONS

A.P.S. Chauhan and S.C. Bhardwaj, "Detection of bare PCB defects by image subtraction method using machine vision", Proceedings of the World Congress on Engineering, vol. 2, pp. 6-8. (Year: 2011).*

Raj, Ananthu, and A. Sajeena. "Defects detection in PCB using image processing for industrial applications." 2018 Second International Conference on Inventive Communication and Computational Technologies (ICICCT). IEEE, 2018. (Year: 2018).*

Zhang, Zhongqiu, et al. "An automatic recognition method for PCB visual defects." 2018 International Conference on Sensing, Diagnostics, Prognostics, and Control (SDPC). IEEE, 2018. (Year: 2018).*

Haselmann, Matthias, Dieter P. Gruber, and Paul Tabatabai. "Anomaly detection using deep learning based image completion." 2018 17th IEEE international conference on machine learning and applications (ICMLA). IEEE, 2018. (Year: 2018).*

Office Action issued in corresponding Japan Patent Application No. 2022-518521, dated Jan. 17, 2023, 5 pages including 3 pages of English translation.

G. E. Hinton et al., "Reducing the Dimensionality of Data with Neural Networks", Science, vol. 313, No. 5786, Jul. 28, 2006, pp. 504-507.

International Search Report (PCT/ISA/210) with English translation and Written Opinion (PCT/ISA/237) mailed on Jul. 21, 2020, by the Japanese Patent Office as the International Searching Authority for International Application No. PCT/JP2020/018187.

O. Ronneberger, et al., "U-Net: Convolutional Networks for Biomedical Image Segmentation", Medical Image Computing and Computer-Assisted Intervention (MICCAI), Springer, LNCS, vol. 9351, May 18, 2015, pp. 234-241.

First Office Action dated Mar. 7, 2025, issued in the corresponding Chinese Patent Application No. 202080100051.5, 30 pages including 14 pages of English Translation.

Second Office Action dated Jul. 31, 2025, issued in the corresponding Chinese Patent Application No. 202080100051.5, 30 pages including 15 pages of English Translation.

Decision of Refusal dated Dec. 1, 2025, issued in the corresponding Chinese Patent Application No. 202080100051.5, 41 pages including 24 pages of English Translation.

\* cited by examiner

FIG.4

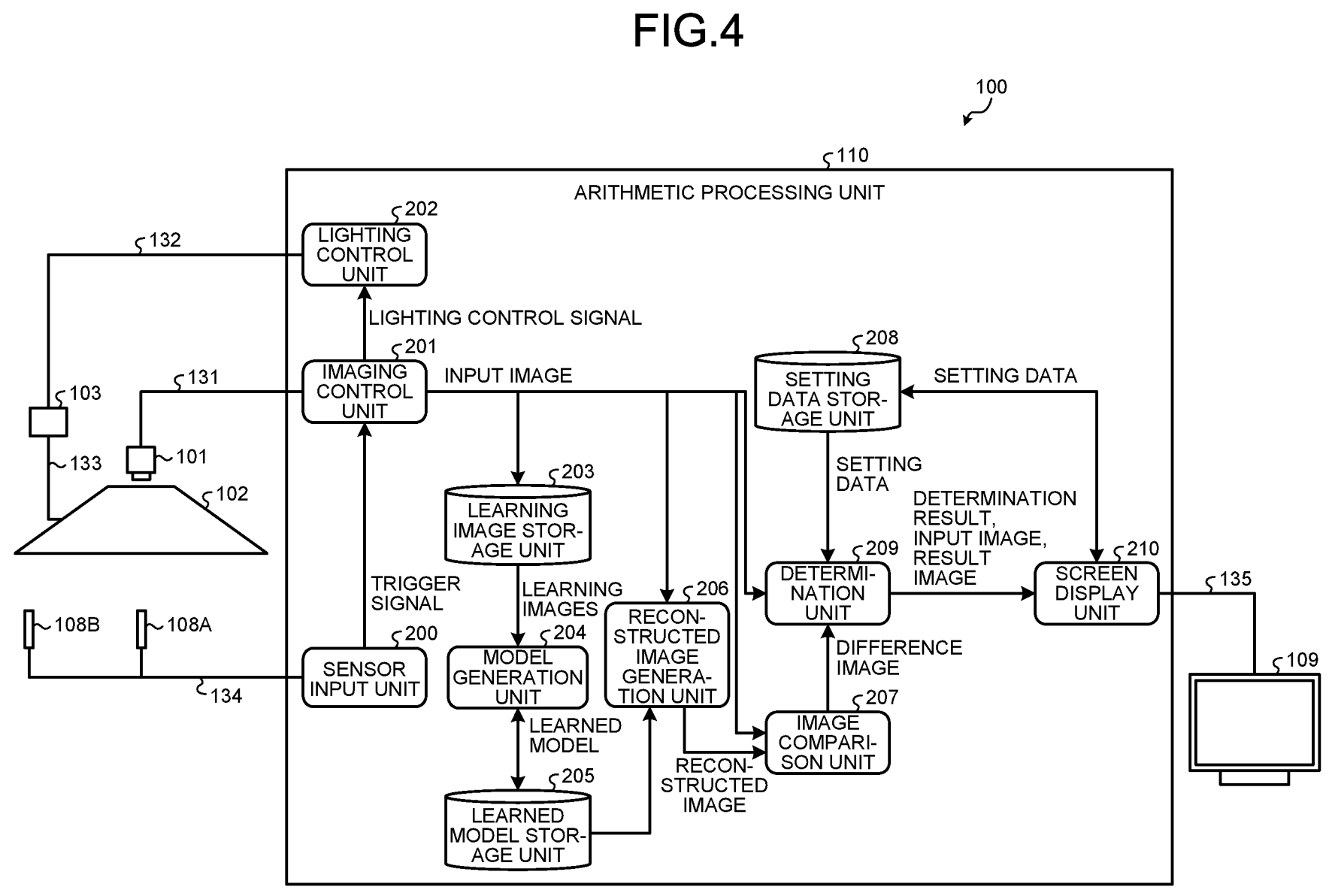

ARITHMETIC PROCESSING UNIT ~110

100

202 LIGHTING CONTROL UNIT

201 IMAGING CONTROL UNIT

200 SENSOR INPUT UNIT

LIGHTING CONTROL SIGNAL

INPUT IMAGE

TRIGGER SIGNAL

203 LEARNING IMAGE STORAGE UNIT

LEARNING IMAGES

204 MODEL GENERATION UNIT

LEARNED MODEL

205 LEARNED MODEL STORAGE UNIT

206 RECONSTRUCTED IMAGE GENERATION UNIT

RECONSTRUCTED IMAGE

208 SETTING DATA STORAGE UNIT

SETTING DATA

209 DETERMINATION UNIT

DIFFERENCE IMAGE

207 IMAGE COMPARISON UNIT

RECONSTRUCTED IMAGE

SETTING DATA

DETERMINATION RESULT, INPUT IMAGE, RESULT IMAGE

210 SCREEN DISPLAY UNIT

Figure 5:
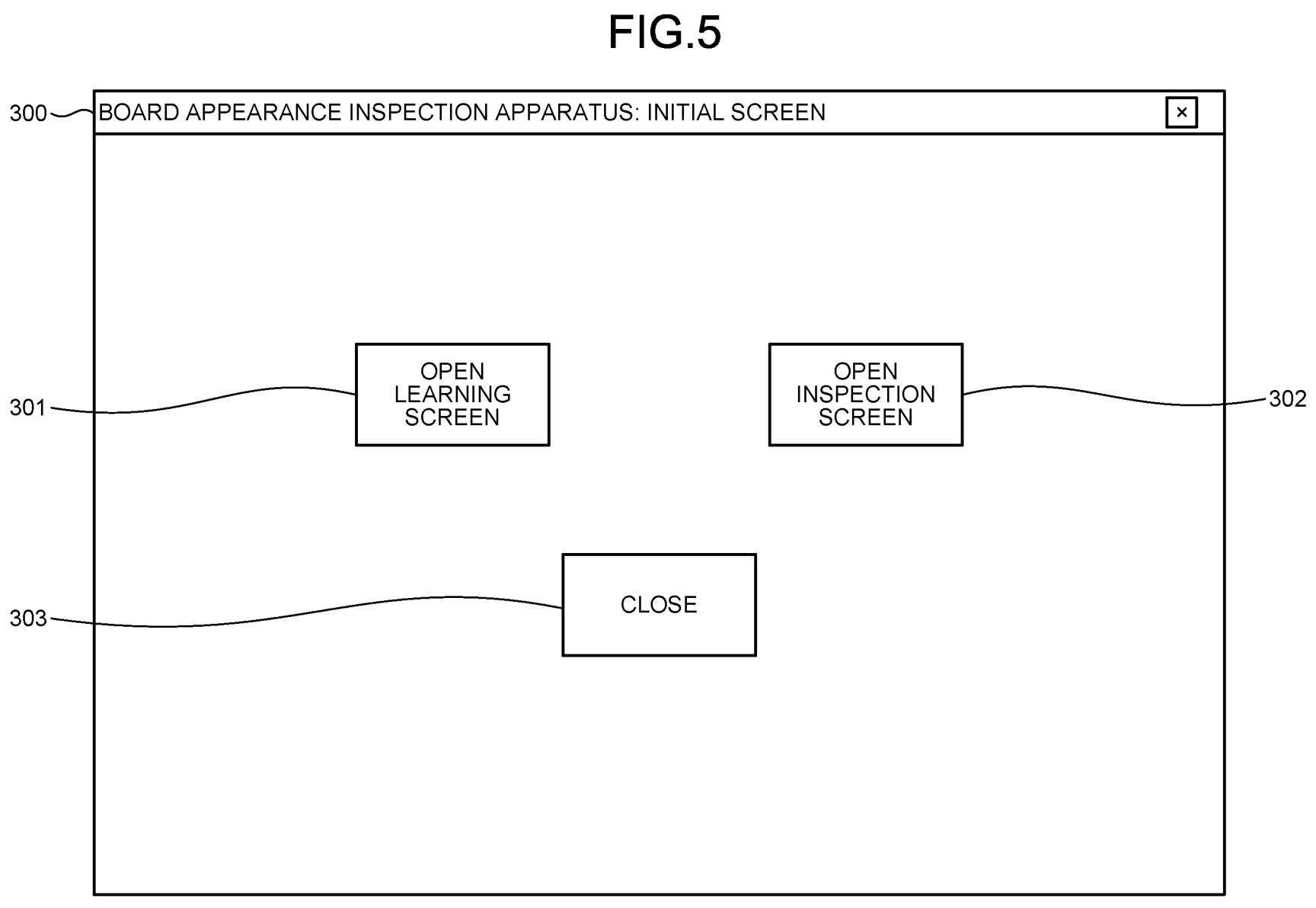

BOARD APPEARANCE INSPECTION APPARATUS: INITIAL SCREEN

300

302

301 OPEN LEARNING SCREEN

OPEN INSPECTION SCREEN

303 CLOSE

FIG.6

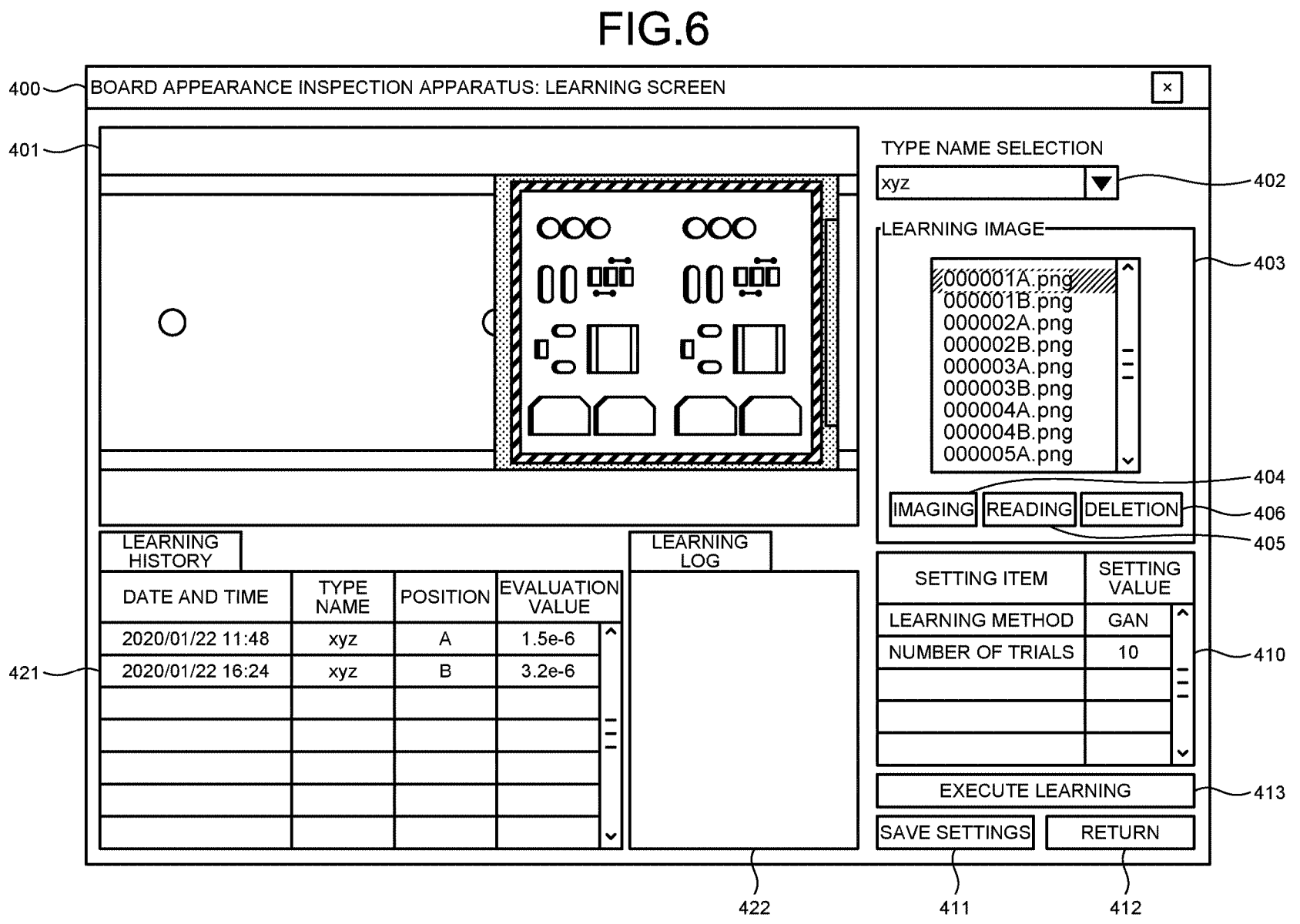

BOARD APPEARANCE INSPECTION APPARATUS: LEARNING SCREEN

TYPE NAME SELECTION xyz

LEARNING IMAGE 000001A.png
000001B.png
000002A.png
000002B.png
000003A.png
000003B.png
000004A.png
000004B.png
000005A.png

IMAGING | READING | DELETION

| SETTING ITEM | SETTING VALUE |
|---|---|
| LEARNING METHOD | GAN |
| NUMBER OF TRIALS | 10 |

EXECUTE LEARNING

SAVE SETTINGS | RETURN

LEARNING LOG

LEARNING HISTORY

| DATE AND TIME | TYPE NAME | POSITION | EVALUATION VALUE |
|---|---|---|---|
| 2020/01/22 11:48 | xyz | A | 1.5e-6 |
| 2020/01/22 16:24 | xyz | B | 3.2e-6 |

FIG.7

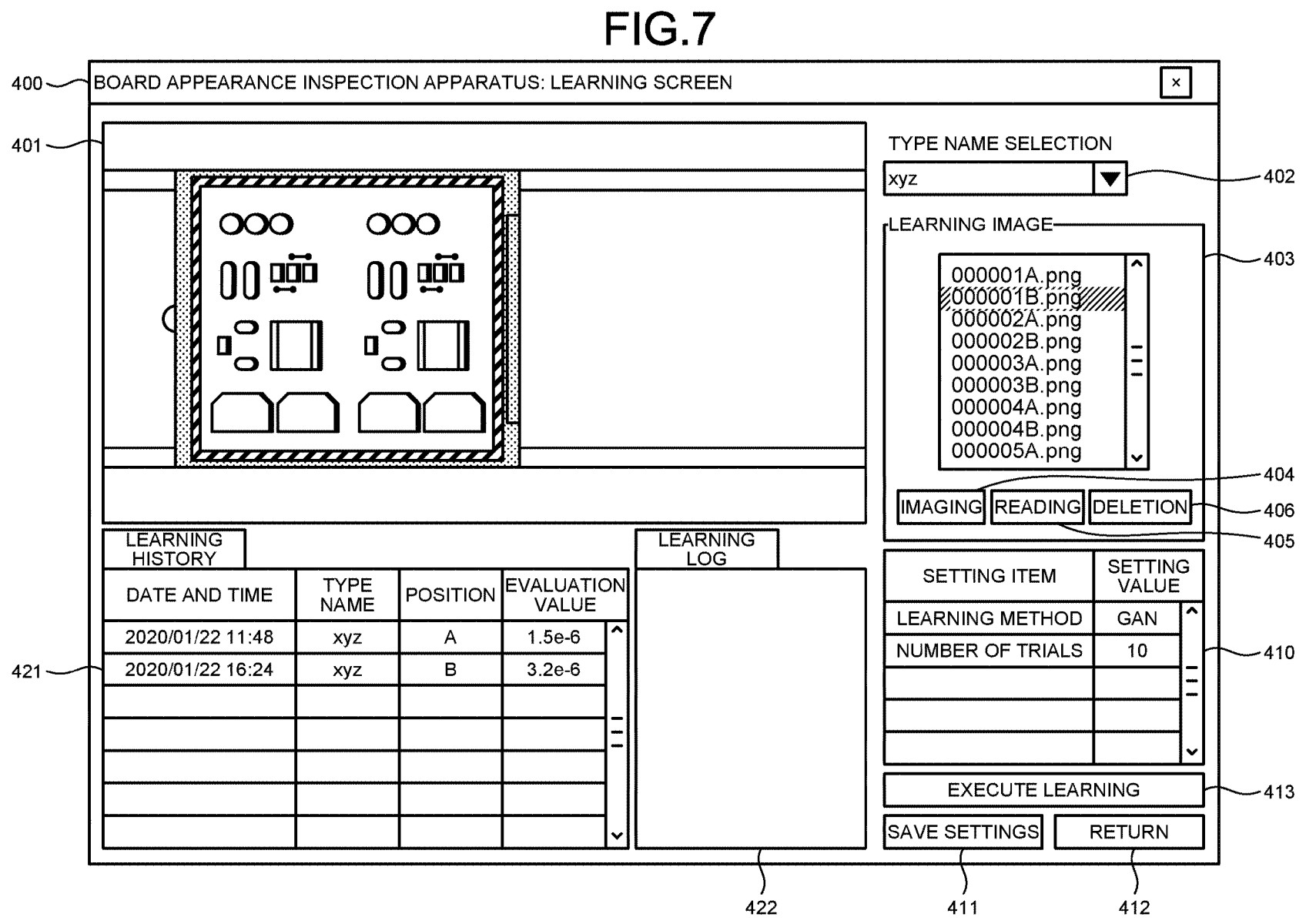

400 BOARD APPEARANCE INSPECTION APPARATUS: LEARNING SCREEN

402 TYPE NAME SELECTION xyz ▶

403 LEARNING IMAGE 000001A.png
000001B.png
000002A.png
000002B.png
000003A.png
000003B.png
000004A.png
000004B.png
000005A.png

404 IMAGING | 406 READING | 405 DELETION

410

| SETTING ITEM | SETTING VALUE |
|---|---|
| LEARNING METHOD | GAN |
| NUMBER OF TRIALS | 10 |

413 EXECUTE LEARNING

411 SAVE SETTINGS | 412 RETURN

401

421 LEARNING HISTORY

| DATE AND TIME | TYPE NAME | POSITION | EVALUATION VALUE |
|---|---|---|---|
| 2020/01/22 11:48 | xyz | A | 1.5e-6 |
| 2020/01/22 16:24 | xyz | B | 3.2e-6 |
| | | | |
| | | | |
| | | | |

422 LEARNING LOG

FIG.13

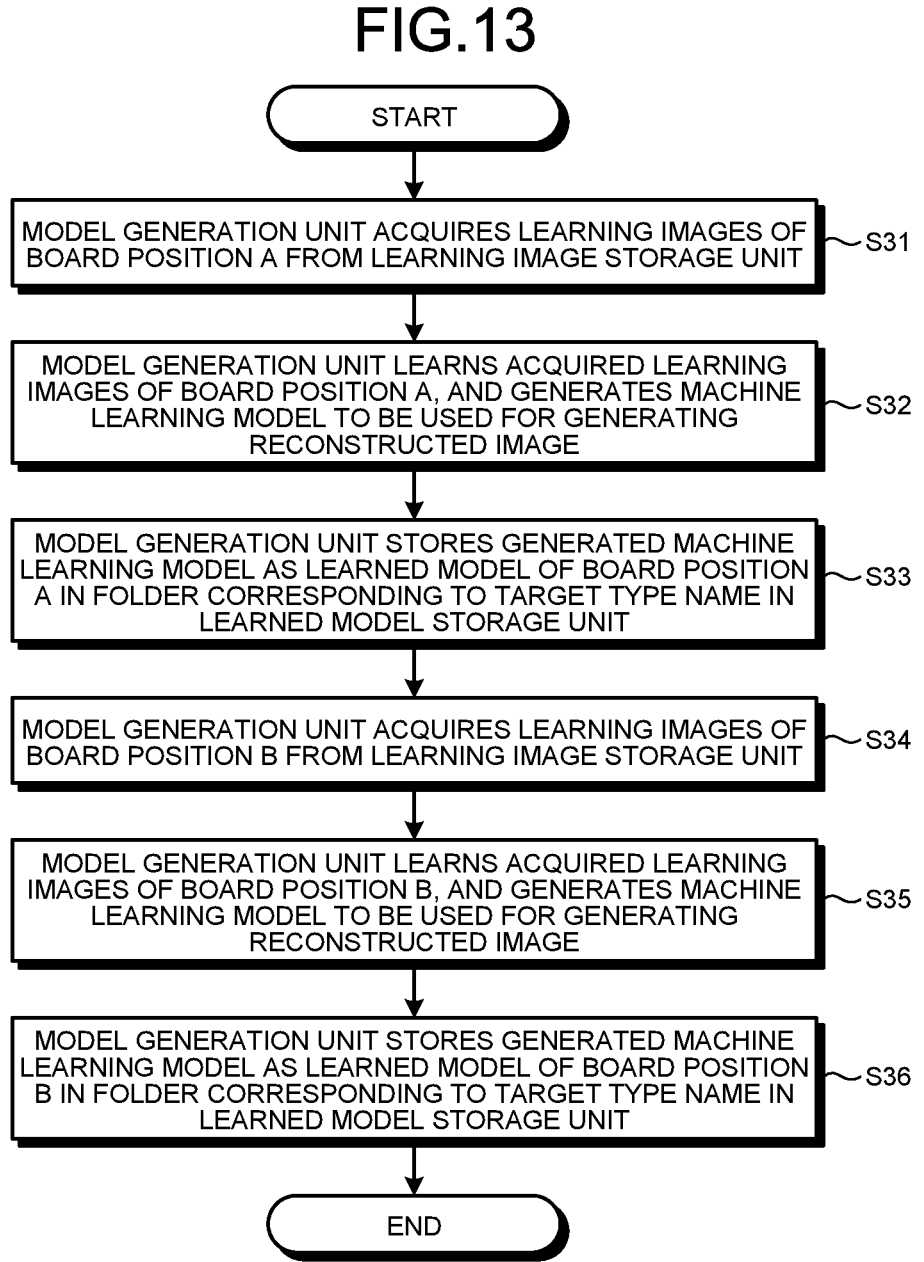

START

MODEL GENERATION UNIT ACQUIRES LEARNING IMAGES OF BOARD POSITION A FROM LEARNING IMAGE STORAGE UNIT — S31

MODEL GENERATION UNIT LEARNS ACQUIRED LEARNING IMAGES OF BOARD POSITION A, AND GENERATES MACHINE LEARNING MODEL TO BE USED FOR GENERATING RECONSTRUCTED IMAGE — S32

MODEL GENERATION UNIT STORES GENERATED MACHINE LEARNING MODEL AS LEARNED MODEL OF BOARD POSITION A IN FOLDER CORRESPONDING TO TARGET TYPE NAME IN LEARNED MODEL STORAGE UNIT — S33

MODEL GENERATION UNIT ACQUIRES LEARNING IMAGES OF BOARD POSITION B FROM LEARNING IMAGE STORAGE UNIT — S34

MODEL GENERATION UNIT LEARNS ACQUIRED LEARNING IMAGES OF BOARD POSITION B, AND GENERATES MACHINE LEARNING MODEL TO BE USED FOR GENERATING RECONSTRUCTED IMAGE — S35

MODEL GENERATION UNIT STORES GENERATED MACHINE LEARNING MODEL AS LEARNED MODEL OF BOARD POSITION B IN FOLDER CORRESPONDING TO TARGET TYPE NAME IN LEARNED MODEL STORAGE UNIT — S36

END

FIG.14

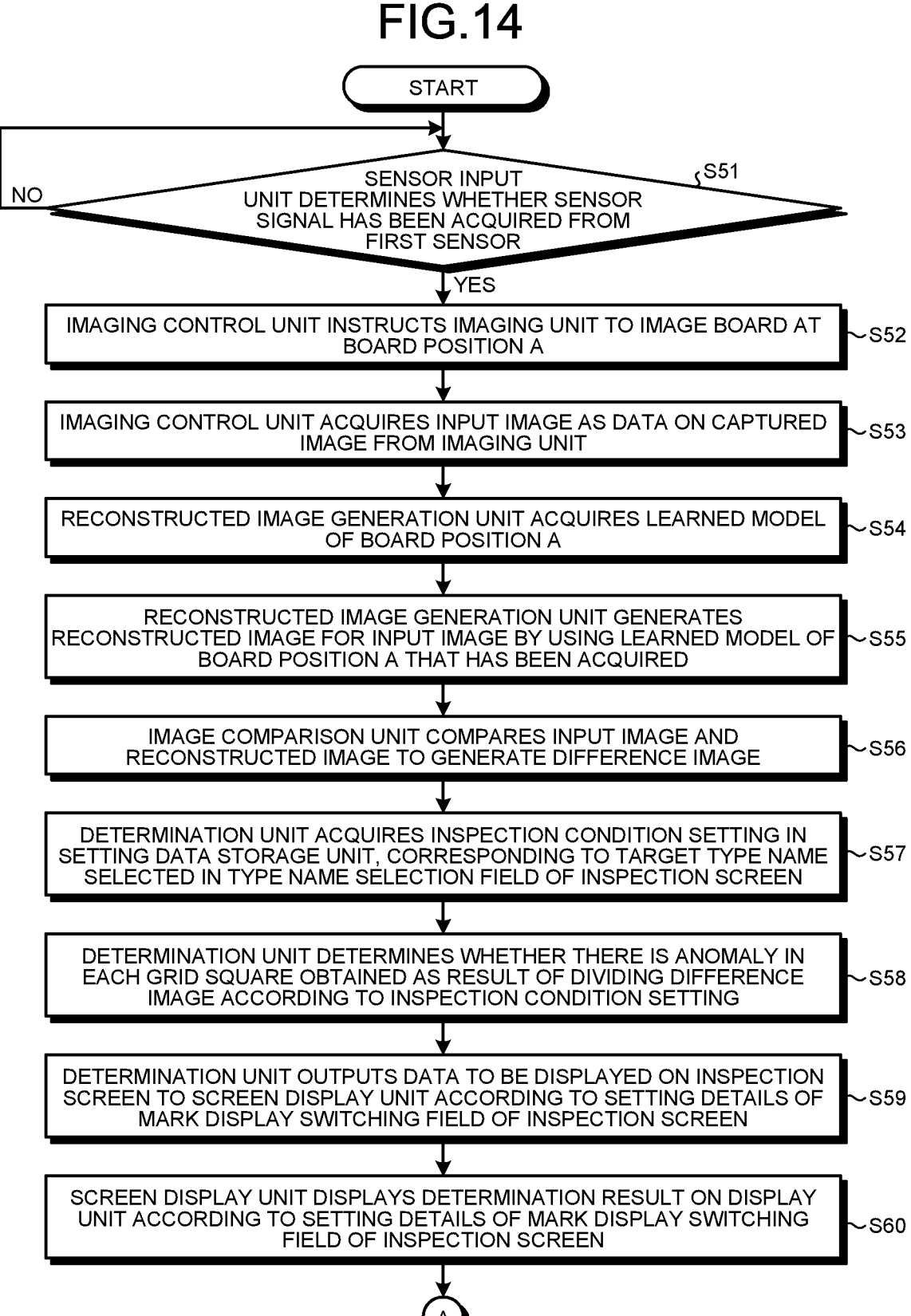

START

S51 SENSOR INPUT UNIT DETERMINES WHETHER SENSOR SIGNAL HAS BEEN ACQUIRED FROM FIRST SENSOR

NO

YES

S52 IMAGING CONTROL UNIT INSTRUCTS IMAGING UNIT TO IMAGE BOARD AT BOARD POSITION A

S53 IMAGING CONTROL UNIT ACQUIRES INPUT IMAGE AS DATA ON CAPTURED IMAGE FROM IMAGING UNIT

S54 RECONSTRUCTED IMAGE GENERATION UNIT ACQUIRES LEARNED MODEL OF BOARD POSITION A

S55 RECONSTRUCTED IMAGE GENERATION UNIT GENERATES RECONSTRUCTED IMAGE FOR INPUT IMAGE BY USING LEARNED MODEL OF BOARD POSITION A THAT HAS BEEN ACQUIRED

S56 IMAGE COMPARISON UNIT COMPARES INPUT IMAGE AND RECONSTRUCTED IMAGE TO GENERATE DIFFERENCE IMAGE

S57 DETERMINATION UNIT ACQUIRES INSPECTION CONDITION SETTING IN SETTING DATA STORAGE UNIT, CORRESPONDING TO TARGET TYPE NAME SELECTED IN TYPE NAME SELECTION FIELD OF INSPECTION SCREEN

S58 DETERMINATION UNIT DETERMINES WHETHER THERE IS ANOMALY IN EACH GRID SQUARE OBTAINED AS RESULT OF DIVIDING DIFFERENCE IMAGE ACCORDING TO INSPECTION CONDITION SETTING

S59 DETERMINATION UNIT OUTPUTS DATA TO BE DISPLAYED ON INSPECTION SCREEN TO SCREEN DISPLAY UNIT ACCORDING TO SETTING DETAILS OF MARK DISPLAY SWITCHING FIELD OF INSPECTION SCREEN

S60 SCREEN DISPLAY UNIT DISPLAYS DETERMINATION RESULT ON DISPLAY UNIT ACCORDING TO SETTING DETAILS OF MARK DISPLAY SWITCHING FIELD OF INSPECTION SCREEN

A

APPEARANCE INSPECTION APPARATUS AND APPEARANCE INSPECTION METHOD FOR ELECTRONIC CIRCUIT BOARDS

FIELD

The present disclosure relates to an appearance inspection apparatus and an appearance inspection method for inspecting an inspection target for an anomaly in appearance by image processing.

BACKGROUND

Patent Literature 1 discloses a board appearance inspection apparatus that examines whether the attachment state of an electronic component mounted on a board is good or bad, that is, whether there is a problem such as a lift or inclination by using an image of an end portion of a lead of the component on a solder surface on which the component is soldered to the board. The solder surface is a surface opposite to a component surface of the board on which the component is mounted. The board appearance inspection apparatus described in Patent Literature 1 includes an imaging device disposed in such a way as to face the solder surface of the board In addition, the board appearance inspection apparatus described in Patent Literature 1 includes a variable calculation processing means and a quality determination processing means. The variable calculation processing means calculates a variable representing the state of the end portion of the lead of the electronic component on the basis of an image of the end portion captured by the imaging device. The quality determination processing means compares the calculated variable with a reference value, and determines whether the attachment state of the electronic component is good or bad on the basis of a result of the comparison,

CITATION LIST

Patent Literature

Patent Literature 1: Japanese Patent Application Laid-open No. 2003-092500

SUMMARY

Technical Problem

However, in order to prevent adhesion of a foreign substance to a lens of the imaging device, the imaging device is provided above the board in such a way as to capture a downward view image in the board appearance inspection apparatus described in Patent Literature 1 Therefore, when the solder surface is imaged, a mechanism for reversing the board is required, so that there has been a problem that it is difficult to introduce the board appearance inspection apparatus described in Patent Literature 1 into an existing board conveyance line. As described above, there has been a demand for a technique for examining, with a simple configuration, whether there is an anomalous portion such as a lift of a component, an inclination of the component, a scratch, or a foreign substance in the inspection target object from image data obtained by the imaging of the object, without reversing the object.

The present disclosure has been made in view of the above, and an object of the present disclosure is to provide an appearance inspection apparatus capable of inspecting an inspection target object for an anomalous portion with a simpler configuration than a conventional technique.

Solution to Problem

In order to solve the above-described problem and achieve the object, an appearance inspection apparatus according to the present disclosure includes an imaging unit, a reconstructed image generation unit, and an image comparison unit. The imaging unit images an object. The reconstructed image generation unit generates a reconstructed image by using a model, the reconstructed image being an image to be obtained by reconstruction of an input image, image data on the object imaged by the imaging unit being used as the input image, the model being used for attempting to reproduce the image data. The image comparison unit generates a difference image corresponding to a difference between the input image and the reconstructed image.

Advantageous Effects of Invention

The appearance inspection apparatus according to the present, disclosure has the effect of enabling inspection for an anomalous portion of an inspection target object with a simpler configuration than a conventional technique.

BRIEF DESCRIPTION O:F DRAWINGS

FIG. 4 is a block diagram schematically showing an example of a functional configuration of the board appearance inspection apparatus according to the first embodiment.

FIG. 5 is a diagram showing an example of a configuration of an initial screen in the board appearance inspection apparatus according to the first embodiment.

FIG. 6 is a diagram showing an example of a configuration of a learning screen in the board appearance inspection apparatus according to the first embodiment.

FIG. 7 is a diagram showing an example of the configuration of the learning screen in the board appearance inspection apparatus according to the first embodiment.

FIG. 13 is a flowchart showing an example of a processing procedure for a learning method to be performed in the board appearance inspection apparatus according to the first embodiment.

FIG. 14 is a flowchart showing an example of a processing procedure for a board appearance inspection method to be performed in the board appearance inspection apparatus according to the first embodiment.

DESCRIPTION OF EMBODIMENTS

Hereinafter, an appearance inspection apparatus and an appearance inspection method according to an embodiment of the present disclosure will be described in detail with reference to the drawings.

First Embodiment

Figure 1:
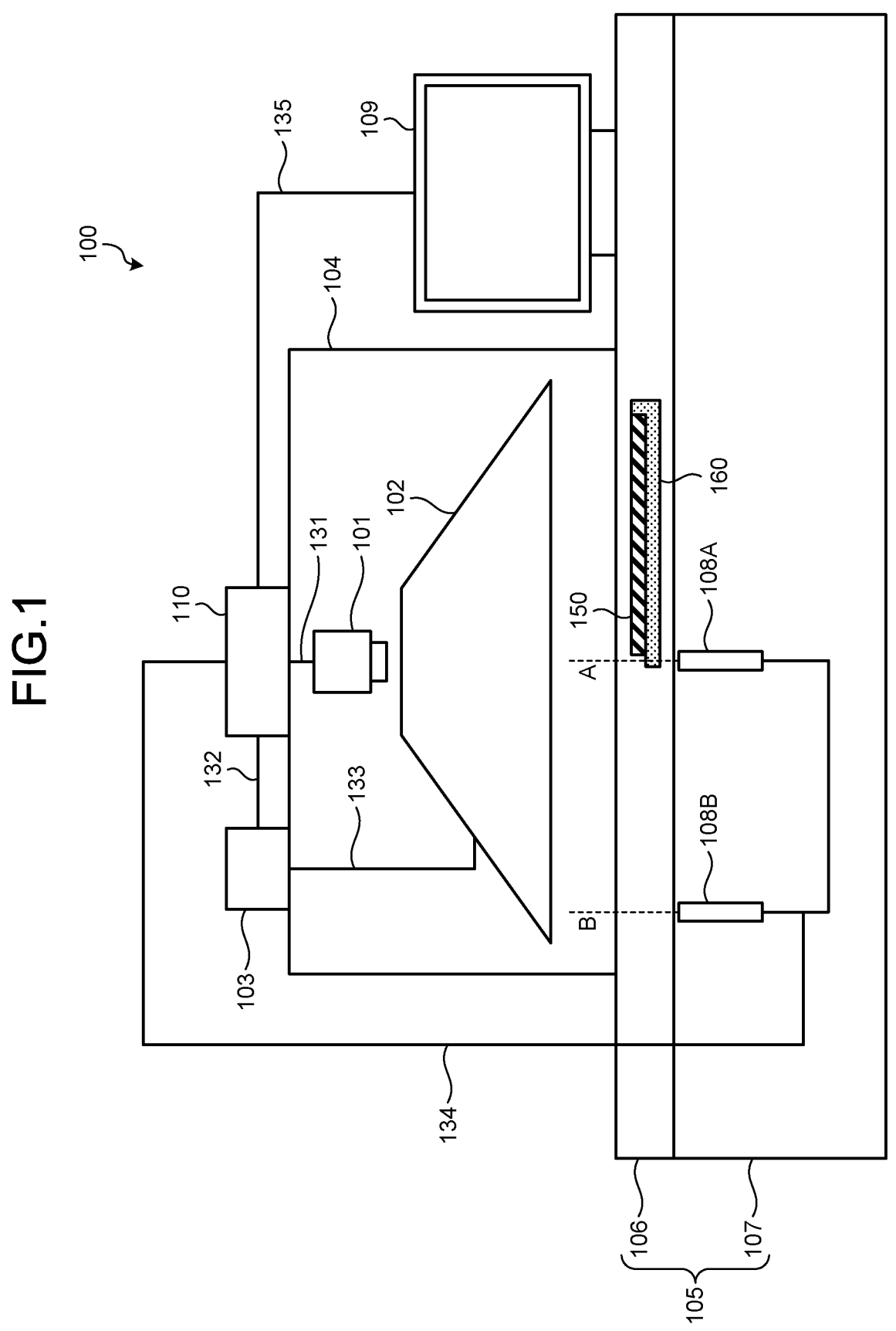
FIG. 1 is a diagram schematically showing an example of a configuration of a board appearance inspection apparatus according to a first embodiment.

In the following embodiment, a board appearance inspection apparatus that inspects a board for an anomaly in appearance will be described as an example of an appearance inspection apparatus. In addition, a board appearance inspection method to be performed in a board appearance inspection apparatus will be described as an example of an appearance inspection method. FIG. 1 is a diagram schematically showing an example of a configuration of a board appearance inspection apparatus according to a first embodiment. A board appearance inspection apparatus 100 includes an imaging unit 101, a lighting apparatus 102, a lighting power supply 103, a shading cover 104 a board conveyance unit 105, a first sensor 108A, a second sensor 108B, a display unit 109, and an arithmetic processing unit 110.

The imaging unit 101 is a piece of equipment for imaging a board 150 as an object. An example of the imaging unit 101 is a camera including a lens and an imaging element. The imaging unit 101 is connected to the arithmetic processing unit 110 by an imaging unit connection cable 131. The imaging unit 101 outputs image data on a captured image to the arithmetic processing unit 110 via the imaging unit connection cable 131. An example of the imaging unit connection cable 131 is a universal serial bus (USB) cable or a local area network (LAN) cable.

The lighting apparatus 102 is a light source that emits light for ad lusting the brightness of the board 150 when the board 150 is imaged. An example of the lighting apparatus 102 is a domical light emitting diode (LED) light.

The lighting power supply 103 is a device for supplying power to the lighting apparatus 102. In one example, the lighting power supply 103 has a control function of controlling the turn-on of the lighting apparatus 102 in accordance with a turn-on control signal supplied from the arithmetic processing unit 110. The turn-on control signal is a signal for controlling the turn-on of the lighting apparatus 102. The turn-on control signal is a signal for controlling the turn-on or turn-off of the lighting apparatus 102 and the brightness of the lighting apparatus 102 turned on. The lighting power supply 103 is connected to the arithmetic processing unit 110 by a lighting power supply control cable 132. The lighting power supply 103 controls the turn-on of the lighting apparatus 102 according to the turn-on control signal transmitted via the lighting power supply control cable 132. An example of the lighting power supply control cable 132 is a USB cable or a recommended standard (RS) 232C cable. The lighting power supply 103 is connected to the lighting apparatus 102 by a lighting power supply cable 133. The lighting power supply 103 not only supplies power but also transmits the turn-on control signal, to the lighting apparatus 102 via the lighting power supply cable 133. A cable dedicated to a lighting apparatus is generally used as the lighting power supply cable 133.

The shading cover 104 is a cover for preventing ambient light from entering when the board 150 is imaged. The shading cover 104 is disposed above the imaging position of the board 150.

The board conveyance unit 105 is a device that conveys the board 150. The board conveyance unit 105 includes a board conveyance mechanism 106 and a board conveyance mechanism frame 107. The board conveyance mechanism 10 conveys the board 150. The board conveyance mechanism frame 107 supports the board conveyance mechanism. 106. The board 150 is mounted on a board conveyance tray 160, and is conveyed on a conveyance path of the board conveyance mechanism 106.

Figure 2:
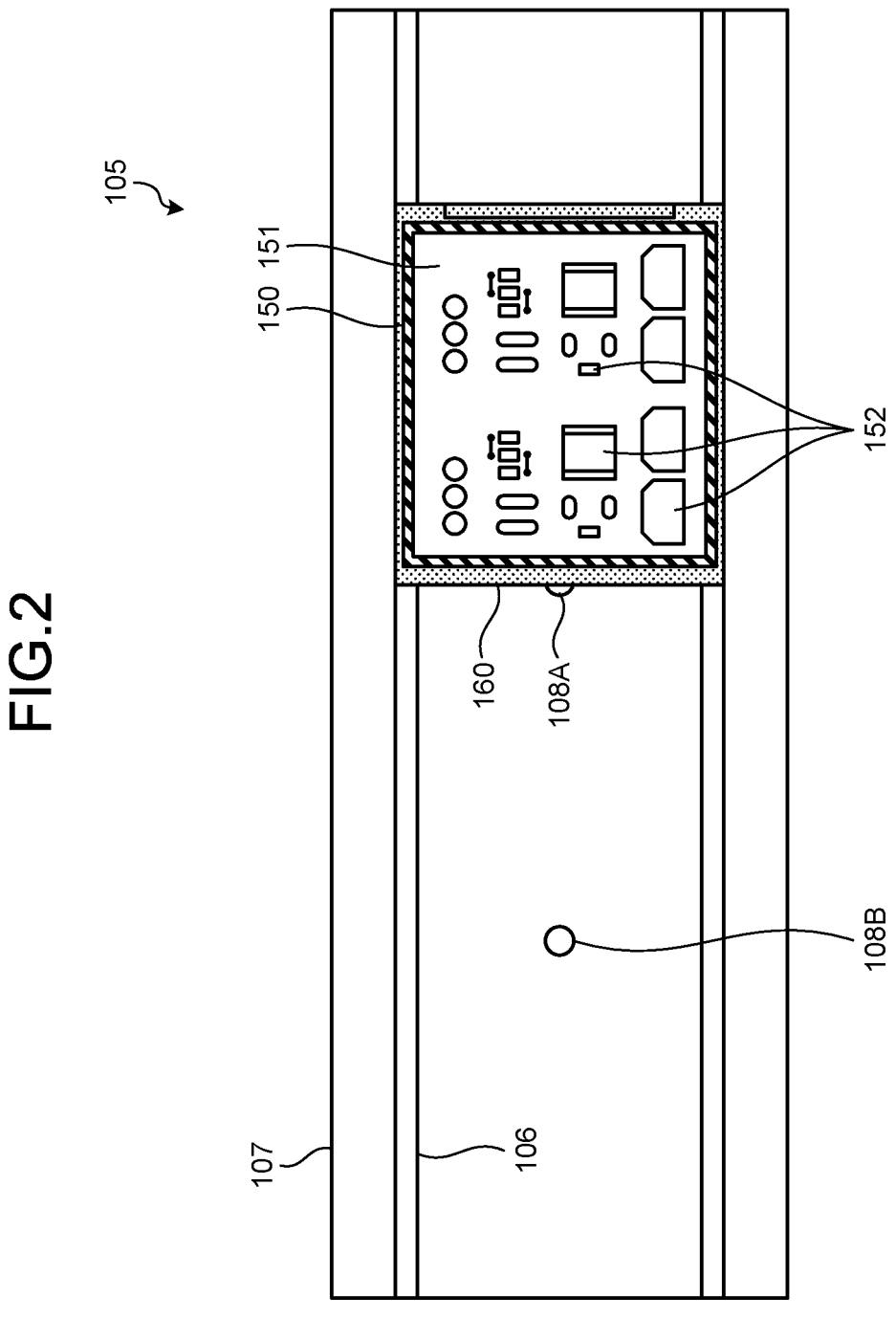
FIG. 2 is a top view of a board conveyance unit of the board appearance inspection apparatus according to the first embodiment, which shows an example of a configuration of the board conveyance unit on which a board has been placed.

FIG. 2 is a top view of the board conveyance unit of the board appearance inspection apparatus according to the first embodiment, which shows an example of a configuration of the board conveyance unit on which the board has been placed. The board 150 includes a circuit substrate 151 and electronic components 152. The circuit substrate 151 is made of a glass epoxy material or the like. The electronic components 152 include a semiconductor element and a circuit element mounted on the circuit substrate 151. The electronic components 152 are bonded onto the circuit substrate 151 with solder. Note that one surface of the circuit substrate 151 is a component surface on which the electronic components 152 are mounted, and a surface opposite to the component surface is a solder surface on which the mounted electronic components 152 are bonded to the board 150 with solder. As illustrated in FIG. 2, the board 150 is placed on the board conveyance tray 160 with the component surface facing upward. The board conveyance tray 160 is a tray for conveying the board 150 mounted thereon. The board 150 corresponds to an electronic circuit board. The electronic component 152 corresponds to a component.

It is possible to transfer the board conveyance tray 160 to and from devices in preceding and subsequent stages by connecting the conveyance path of the board conveyance mechanism 106 to conveyance paths of the devices in the preceding and subsequent stages. In one example, the board conveyance mechanism 105 includes conveyance path component parts (not illustrated) and a drive unit (not illustrated). The conveyance path component parts include a chain, a belt conveyor, and the like. The drive unit includes an electric motor and a speed reducer that drive the conveyance path component parts. The conveyance path is provided such that the board 150 passes below the imaging unit 101. The board conveyance mechanism frame 107 is installed on a floor surface.

Returning to FIG. 1, the first sensor 108A and the second sensor 108B are provided on the conveyance path of the board conveyance mechanism 106. The first sensor 108A and the second sensor 108B each detect the position of the board 150 on the conveyance path, and output a detection result to the arithmetic processing unit 110. Specifically, the first sensor 108A and the second sensor 108B detect that the board 150 was located at predetermined different positions on the conveyance path. In this example, the first sensor 108A and the second sensor 108B are provided at desired positions where the board 150 is to be imaged on the conveyance path. The first sensor 108A detects that the board 150 has reached a position A on the conveyance path. The second sensor 108B detects that the board 150 has reached a position B on the conveyance path. In one example, the first sensor 108A and the second sensor 108B are light shielding sensors. Assume that the first sensor 108A and the second sensor 108B are set such that each of the first sensor 108A and the second sensor 108B detects arrival of the board conveyance tray 160 as a result of being shielded from light, and outputs, to the arithmetic processing unit 110, a single sensor signal indicating that the board 150 has been detected. Note that, hereinafter, the position A on the conveyance path where the first sensor 108A is disposed is referred to as a board position A, and the position B on the conveyance path where the second sensor 108B is disposed is referred to as a board position B.

Figure 3:
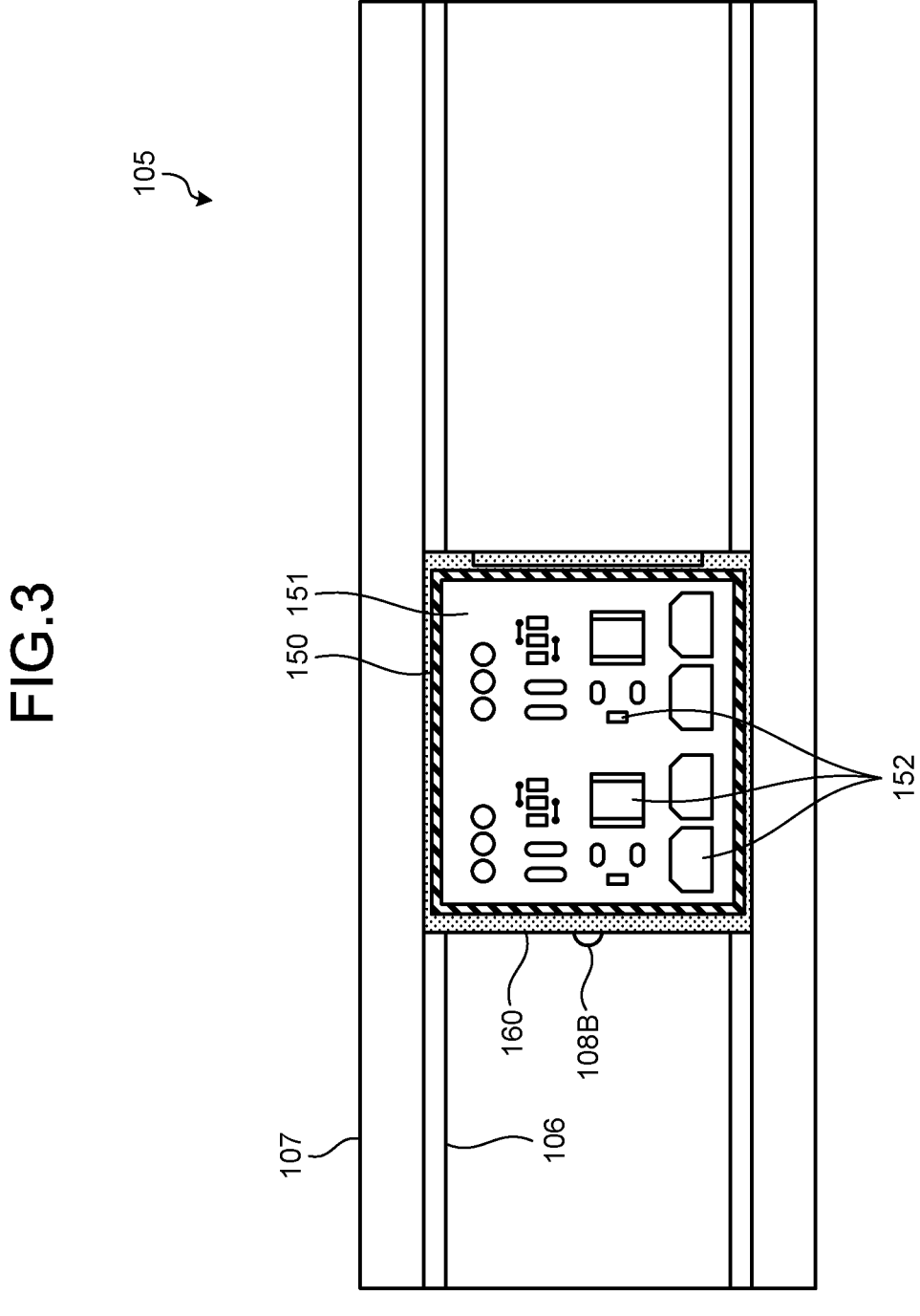
FIG. 3 is a top view of the board conveyance unit of the board appearance inspection apparatus according to the first embodiment, which schematically shows an example of a position where the board is located on the board conveyance unit at the time of imaging.

FIG. 3 is a top view of the board conveyance unit of the board appearance inspection apparatus according to the first embodiment, which schematically shows an example of a position where the board is located on the board conveyance unit at the time of imaging. FIG. 2 illustrates a state in which the board conveyance tray 160 has reached the board position A. At this time, since the first sensor 108A is covered by the board conveyance tray 160, the first sensor 108A outputs a sensor signal to the arithmetic processing unit 110. As a result, the board 150 is imaged by the imaging unit 101. FIG. 3 illustrates a state in which the board conveyance tray 150 has reached the board position B. At this time, since the second sensor 108B is covered by the board conveyance tray 160, the second sensor 108B outputs a sensor signal to the arithmetic processing unit 110. As a result, the board 150 is imaged by the imaging unit 101.

Returning to FIG. 1, the two sensors, that is, the first sensor 108A and the second sensor 108B are connected to the arithmetic processing unit 110 by a sensor connection cable 134. The sensor connection cable 134 transmits sensor signals which are results of detection in the first sensor 108A and the second sensor 108B. An example of the sensor connection cable 134 is a USB cable, an RS 232C cable, or a digital signal line.

The display unit 109 displays information. In the first embodiment, the display unit 109 displays an operation screen and the like of the arithmetic processing unit 110. An example of the display unit 109 is a liquid crystal display device. The display unit 109 is connected to the arithmetic processing unit 110 by a display connection cable 135. The display connection cable 135 is a cable for connecting the arithmetic processing unit 110 and the display unit 109, and transmits a signal for screen display. An example of the display connection cable 135 is a Video Graphics Array (VGA) cable or a High-Definition Multimedia Interface (HDMI) (registered trademark) cable.

The arithmetic processing unit 110 controls imaging processing in the imaging unit 101 on the basis of sensor signals from the first sensor 108A and the second sensor 108B. The arithmetic processing unit 110 learns a model for reconstructing an input image to be used at the time of board appearance inspection processing, by using image data on images for learning captured by the imaging unit 101. The arithmetic processing unit 110 generates a reconstructed image by reconstructing an input image captured by the imaging unit 101, according to the learned model. The input image is an image of the board 150 to be inspected. Then, the arithmetic processing unit 110 compares the reconstructed image with the input image to determine an anomaly in the attachment states of the electronic components 152 including an inclination or lift and an anomaly in the surface states of the electronic components 152 including a scratch or foreign substance.

FIG. 4 is a block diagram schematically showing an example of a functional configuration of the board appearance inspection apparatus according to the first embodiment. In FIG. 4, a functional configuration of the arithmetic processing unit 110 is illustrated in detail. Furthermore, in the following description, the same constituent elements as those described in. FIG. 1 are denoted by the same reference numerals, and description thereof will be omitted. The arithmetic processing unit 110 includes a sensor input unit 200 an imaging control unit 201, a lighting control unit 202, a learning image storage unit 203, a model generation unit 204, a learned model storage unit 205, a reconstructed image generation unit 206, an image comparison unit 207, a setting data storage unit 208, a determination unit 209, and a screen display unit 210.

The sensor input unit 200 monitors the first sensor 108A and the second sensor 108B, and outputs a trigger signal to the imaging control unit 201 when it is confirmed that the board 150 has reached a predetermined board position. The trigger signal is a signal that triggers the imaging unit 101 to perform imaging. Specifically, upon receiving a sensor signal from the first sensor 108A or the second sensor 108B, the sensor input unit 200 outputs a trigger signal to the imaging control unit 201.

Upon receiving the trigger signal from the sensor input unit 200, the imaging control unit 201 outputs, to the lighting control unit 202, a lighting control signal that is a signal for instructing the lighting control unit 202 to prepare for the turn-on of the lighting apparatus 102. As a result, the turn-on state of the lighting apparatus 102 is controlled to adjust illuminance for imaging to be performed by the imaging unit 101. Furthermore, after issuing the lighting control signal, the imaging control unit 201 outputs an instruction to image the board 150 to the imaging unit 101, and outputs, as an input image, image data on an image of the component surface of the board 150 captured by the imaging unit 101 to the learning image storage unit 203, the reconstructed image generation unit 206, the is comparison unit 207, and the determination unit 209. Here, for example, the imaging control unit 201 may output, as an input image, a result of processing of the captured image based on affine transformation, projective transformation, or the like. Outputting such a processed input image reduces the influence of variation in the position and inclination of the board 150 at the time of imaging.

Upon receiving the lighting control signal from the imaging control unit 201, the lighting control unit 202 outputs, to the lighting power supply 103, a turn-on control signal that is a signal for controlling the turn-on state of the lighting apparatus 102. As a result, the lighting power supply 103 is controlled, and the turn-on state of the lighting apparatus 102 is controlled.

In a case where the board 150 imaged by the imaging unit 101 is a board for learning, the learning image storage unit 203 stores the input image from the imaging unit 101 as a learning image. The learning image storage unit 203 can store a plurality of input images. The learning image storage unit 203 stores the learning image in association with the type name of the board 150. In one example, a folder is created for each type name, and a learning image with a type name corresponding to a folder name of each folder is stored in the folder in the learning image storage unit 203. The learning image is an image of the component surface of the board 150 that is a normal board on which the electronic components 152 are normally attached to the circuit substrate 151 with solder. The normal board 150 is the board 150 on which the electronic components 152 are mounted in a state in which the appearance of the board 150 is regarded as normal as a product. The normal board 150 corresponds to a learning target object. In one example, the board 150 having an appearance that is regarded as normal as a product is defined by the angle of inclination of a component with respect to the board 150, the height of a lift of a component, and the presence or absence, size, or the like of a scratch or foreign substance. In addition, in a case where whether the board 150 has an appearance that is regarded as normal as a product is visually examined, the board 150 having an appearance to be regarded as normal as a product may be defined by a limit sample indicating a limit for determination as to whether the board 150 passes or fails in appearance. Therefore, even in a case where the board 150 cannot be used as a product due to a component failure, a circuit anomaly, or the like, the board 150 can be used as a learning target object if the board 150 has an appearance that is regarded as normal as a product. An example of the learning image storage unit 203 is a hard disk drive (HDD) or a solid state drive (SSD).

The model generation unit 204 generates a learned model for generating a reconstructed image, by using image data on a learning target object that is an object having an appearance that is regarded as normal as a product. In this example, the model generation unit 204 generates a learned model for generating a reconstructed image, by choosing the normal board 150 as a learning target object from among the boards 150 having component surfaces, and using image data on the component surface of the learning target object. The reconstructed image is an image to be obtained by reconstruction of the image data. The normal board 150 is the board 150 on which the electronic components 152 are mounted in a state in which the appearance of the board 150 is regarded as normal as a product. That is, the model generation unit 204 acquires learning images from the learning image storage unit 203, and learns a machine learning model to be used for generating a reconstructed image in the reconstructed image generation unit 206. In one example, the model generation unit 204 reconstructs image data on a learning target object so that the image data on the learning target object are reproduced, and generates a learned model for generating a reconstructed image. When the learned model is used, the same image as an image corresponding to input data is usually obtained as a reconstructed image, but it is inferred that a portion of the reconstructed image is an anomalous portion if the portion cannot be reconstructed in the same manner as the input data by use of the learned model. The learned model is a model generated as a result of learning performed by use of image data on the normal board 150 as input data, and is used for generating a reconstructed image that is an image to be obtained by reconstruction of the input data. Here, the model generation unit 204 performs learning according to a learning method and the number of trials set in setting data for learning condition setting in the setting data storage unit 208. For example, a machine learning algorithm such as a generative adversarial network (GAN) or an auto-encoder (AE) is used as the learning method.

Reference Literature 1 (G. E. Hinton and R. R. Salakhutdinov, "Reducing the Dimensionality of Data with Neural Networks", Science, Vol. 313, No. 5786, pp. 504-507 (2006)) discloses a conventional AE for performing dimension reduction of learning images as input data in a network on an encoder side, and generating a reconstructed image as output data such that the dimensionally reduced data are brought close to the input data in a network on a decoder side. In such a conventional AE, it is possible to obtain feature data on the input data as dimensionally reduced data by performing learning such that the data domain of the input data is the same as the data domain of the output data, that is, the output data are brought close to the input data. As a result, it is possible to obtain a reconstructed image generation model capable of restoring only input data having a learned feature with high accuracy.

Meanwhile, in a network having an edge directly connecting each layer of an encoder and each layer of a decoder so as to enable generation of a high-resolution image as disclosed in Reference Literature 2 (O. Ronneberger, P. Fischer, and T. Brox, "U-Net: Convolutional Networks for Biomedical Image Segmentation", Medical Image Computing and Computer-Assisted Intervention (MICCAI), Springer, LNCS, Vol. 9351, pp. 234-241 (2015)), if learning is performed such that output data are brought close to input data, feature data on the input data are not obtained as dimensionally reduced data, and an edge connecting the encoder and the decoder in a shallowest layer is regarded as important. Then, learning proceeds such that the input data are simply output as output data with no change. As a result, there is obtained a reconstructed image generation model that causes output data very similar to input data to be obtained regardless of whether the output data have the same feature as learning images. In such a network in which it is difficult to learn a feature of input data when the data domain of the input data is the same as the data domain of output data, it is possible to solve the above-described problem by changing the domains of the input data and the output data. For example, it is possible to obtain a reconstructed image generation model capable of restoring only input data having a learned feature with high accuracy, by performing learning as a task of conversion of a domain into a different domain, such as a conversion from a computer graphics domain of input data to a photographic domain of output data. Conversion from a photographic domain to an image segmentation domain is performed in Reference Literature 2.

In this case, the output data need to have a data domain for use as a reconstructed image, which is a photographic domain in the first embodiment. In addition, the input data also need to be easily generated from a captured image, that is, the photographic domain. For example, there is a method of using, as input data, a differential signal domain corresponding to difference image data regarding a difference from a reference image prepared in advance. Here, it is possible to use, as the reference image prepared in advance, images prepared in advance such as an image of the board 150 on which the electronic components 152 are not mounted and a board image different from the learning images. Then, a difference between the image of the board 150 on which the electronic components 152 are not mounted and an image of an object is used as input data. In this case, the difference image data are also input to the reconstructed image generation unit 206 to be described below, in the same manner. As another example, it is possible to use, as the input data, image data or the like obtained as a result of some filtering performed on a captured image by use of an edge detection filter or the like. As a result, the amount of information on the input image is reduced, so that learning can be efficiently performed.

The learned model storage unit 205 has a function of storing a learned model that is a learned machine learning model generated by the model generation unit 204. An example of the learned model storage unit 205 is a dynamic random access memory (DRAM) or a flash memory. The learned model is stored for each type name of the board 150.

The reconstructed image generation unit 206 generates a reconstructed image for the input image of the board 150 that is an inspection target object, acquired from the imaging control unit 201, by using a learned model for inferring an anomalous portion that is an anomalous region from image data on the board 150 stored in the learned model storage unit 205. The reconstructed image is obtained as a result of an attempt at reproduction of the input image via the learned model. However, in a case where a certain region of the input image greatly deviates from the range of variation in a learning image group, reproduction of the region fails and an image different from the input, image is generated. In one example, generation of the reconstructed image is implemented by a machine learning model such as a GAN or AE.

The image comparison unit 207 generates a difference image by comparing the reconstructed image generated by the reconstructed image generation unit 206 with the input image acquired from the imaging control unit 201. In one example, in a case where the reconstructed image and the input image are image data in bitmap format, the image comparison unit 207 obtains a difference image by converting the reconstructed image and the input image into grayscale images and then obtaining absolute values of differences between the respective grayscale values of corresponding pixels.

The setting data storage unit 208 stores setting data including a learning condition setting and an inspection condition setting for each type name. The learning condition setting includes a learning method and the number of trials. The learning method refers to a learning method indicating a machine learning model to be used by the model generation unit 204. The number of trials refers to the number of times learning is performed by use of learning data necessary for generation of a learned model. The inspection condition setting includes a grid interval and an anomaly detection threshold value. The grid interval indicates a distance between a pair of parallel sides of a rectangular grid defining a region on which determination is to be made in the difference image. The anomaly detection threshold value is a reference value for determining whether there are anomalies in an attachment state including the inclination or lift of a component on the board 150 and in a surface state including a scratch or foreign substance. In one example, a value of a statistic of pixel values of pixels in a grid square set in the difference image can be used as the anomaly detection threshold value. An example of the statistic is the standard deviation or variance of pixel values of pixels in a grid square. Note that a bitmap file may be specified in the setting of the anomaly detection threshold value such that a threshold value can be separately set for each grid square.

The determination unit 209 divides the difference image generated by the image comparison unit 207 into a plurality of regions by using a grid according to the grid interval, and determines whether there is an anomaly in each grid square by using setting data for the inspection condition setting acquired from the setting data storage unit 208. Then, the determination unit 209 outputs a determination result. In addition, the determination unit 209 generates a result image illustrating, on the input image, a portion of a grid square for which it has been determined that there is an anomaly. That is the result image is an image obtained by extraction of an anomalous portion from the difference image. In one example, the result image is an image that is transparent except for a portion where an anomalous portion is illustrated in the input image. Here, the determination unit 209 determines that it is normal when the standard deviation or variance of pixels in each grid square is less than the anomaly detection threshold value in the inspection condition setting, and determines that it is anomalous when the standard deviation or variance is equal to or greater than the anomaly detection threshold value.

The screen display unit 210 displays an operation screen on the display unit 109. In one example, the screen display unit 210 displays on the display unit 109, an image including an anomalous portion obtained from the result image. In the first embodiment, the operation screen includes an initial screen, a learning screen, and an inspection screen.

FIG. 5 is a diagram showing an example of a configuration of the initial screen in the board appearance inspection apparatus according to the first embodiment. An initial screen 300 is a screen that is first displayed after an application for the board appearance inspection apparatus 100 is started in the arithmetic processing unit 110. The screen display unit 210 receives an operation performed by a user in a state where the initial screen 300 is displayed, and switches a screen to be displayed from the initial screen 300 to a learning screen 400 or an inspection screen 500.

The initial screen 300 includes a button 301 for opening the learning screen, a button 302 for opening the inspection screen, and a close button 303. The button 301 for opening the learning screen is a button for switching the screen to be displayed on the display unit 109 to the learning screen to be described below when the button 301 is clicked by the user via an input unit. The button 302 for opening the inspection screen is a button for switching the screen to be displayed on the display unit 109 to the inspection screen to be described below when the button 302 is clicked by the user via the input unit. The close button 303 is a button for closing the initial screen 300 to end the application for the board appearance inspection apparatus 100 when the close button 303 is clicked by the user via the input unit.

FIGS. 6 and 7 are diagrams showing examples of a configuration of the learning screen in the board appearance inspection apparatus according to the first embodiment. FIG. 6 shows an example of the learning screen 400 displaying a learning image captured at the board position A, and FIG. 7 shows an example of the learning screen 400 displaying a learning image captured at the board position B.

The learning screen 400 is a screen on which an operation related to learning is received, the learning image and the setting data are edited, and an instruction to perform the learning of the machine learning model is issued. The learning screen 400 includes an image display field 401, a type name selection field 402, a learning image selection field 403, a learning image capturing button 404, a learning image read button 405, a learning image deletion button 406, a learning condition setting field 410, a setting saving button 411, a return button 412, a learning execution button 413, a learning history display field 421, and a learning log display field 422.

The image display field 401 is a display area for displaying a learning image. The learning image is selected in the learning image selection field 403.

The type name selection field 402 is a field for selecting a type name of the board 150 to be inspected or newly inputting a type name of the board 150. In one example, the type name selection field 402 is formed as a combo box. Only type names input on the learning screen 400 thus far are listed as selection items.

The learning image selection field 403 is a field for displaying a list of file names of learning images and receiving selection made by the user. In one example, the learning image selection field 403 includes a list box.

When the user selects a type name in the type name selection field 402, the screen display unit 210 lists learning images from a folder having the relevant type name in the learning image storage unit 203, and displays a list of file names of the listed learning images in the learning image selection field 403.

The learning image capturing button 404 is a button for causing the imaging unit 101 to execute imaging processing in response to a user's click.

The learning image read button 405 is a button for executing processing of adding a file name of a learning image to be displayed in the learning image selection field 403. In one example, when the user clicks the learning image read button 405, the screen display unit 210 opens a dialog for selecting from among files of existing learning images stored in the learning image storage unit 203, stores a board position in the learned model storage unit 205 for a file selected by the user from the dialog, and adds the selected file name as an item to the learning image selection field 403.

The learning image deletion button 406 is a button for executing processing of deleting a learning image corresponding to a file name selected in the learning image selection field 403. In one example, when the user clicks the learning image deletion button 406, the screen display unit 210 deletes the file name of the learning image being selected in the learning image selection field 403 from the learning image selection field 403, and also deletes the file of the learning image corresponding to the file name being selected in the learning image selection field 403 from the learning image storage unit 203.

The learning condition setting field 410 is a table in which setting values can be edited for setting items of learning condition setting. The learning condition setting field 410 includes items "setting item" and "setting value". Since the learning condition setting includes the learning method and the number of trials as described above, the "learning method" and the "number of trials" are input, in the "setting item". Details corresponding to each "setting item" are input in the "setting value". The screen display unit 210 reads setting data for the learning condition setting of the relevant type name in the setting data storage unit 208, and displays the setting data in the learning condition setting field 410. Note that when a type name is newly input in the type name selection field 402, the screen display unit 210 creates a folder of the relevant type name in the learning image storage unit 203, clears the learning image selection field 403, and displays a default setting value in the learning condition setting field 410.

The setting saving button 411 is a button for storing setting details of the learning condition setting field 410 in the setting data storage unit 20 in response to a user's click.

The return button 412 is a button for switching the screen to be displayed to the initial screen 300 in response to a user's click.

The learning execution button 413 is a button for issuing an instruction to execute learning processing according to the details set in the learning condition setting field 410, in response to a user's click.

The learning history display field 421 is a field for displaying a history of execution of learning processing. In one example, the learning history display field 421 is formed as a list box. The learning history display field 421 can display a plurality of learning processing execution histories. When one history item is selected from the learning history display field 421, the screen display unit 210 displays details of the selected history item in the image display field 401, the type name selection field 402, the learning condition setting field 410, and the learning log display field 422.

The learning log display field 422 is a field for outputting any desired log data on execution of learning processing. In one example, the learning log display field 422 is formed as a text box.

Figure 8:
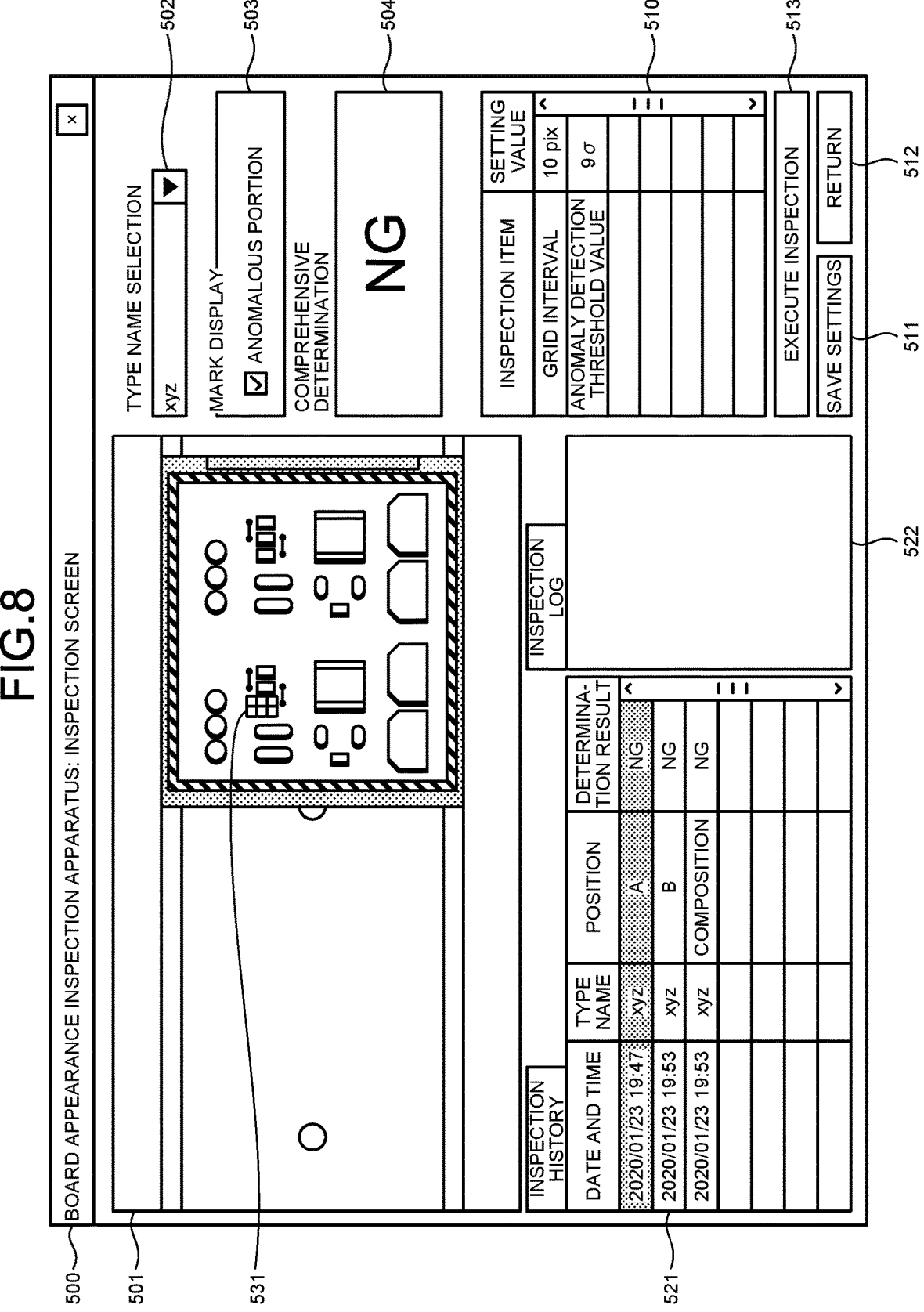
FIG. 8 is a diagram showing an example of a configuration o:f an inspection screen in the board appearance inspection apparatus according to the first embodiment.
Figure 9:
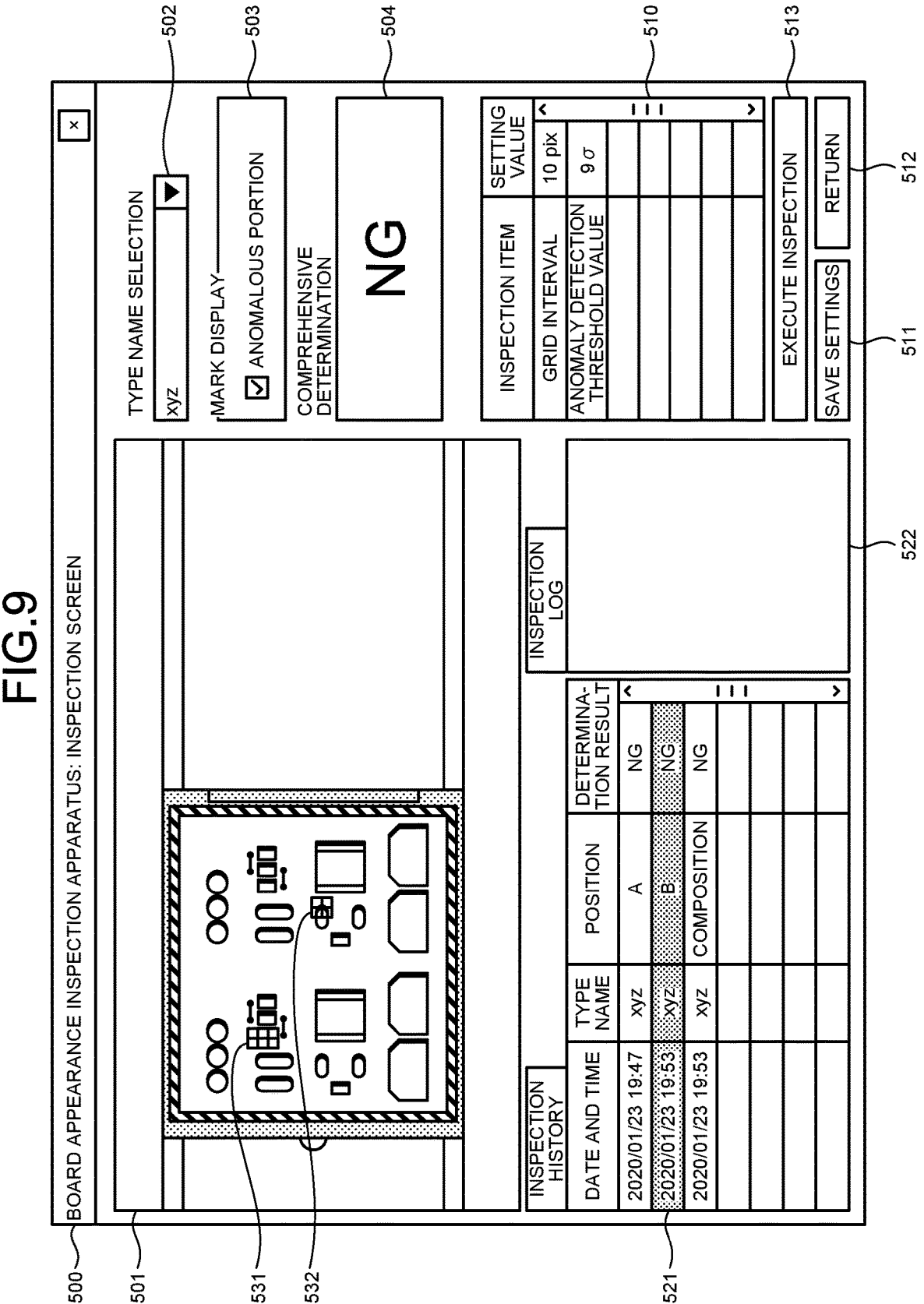
FIG. 9 is a diagram showing an example of the configuration of the inspection screen in the board appearance inspection apparatus according to the first embodiment.
Figure 10:
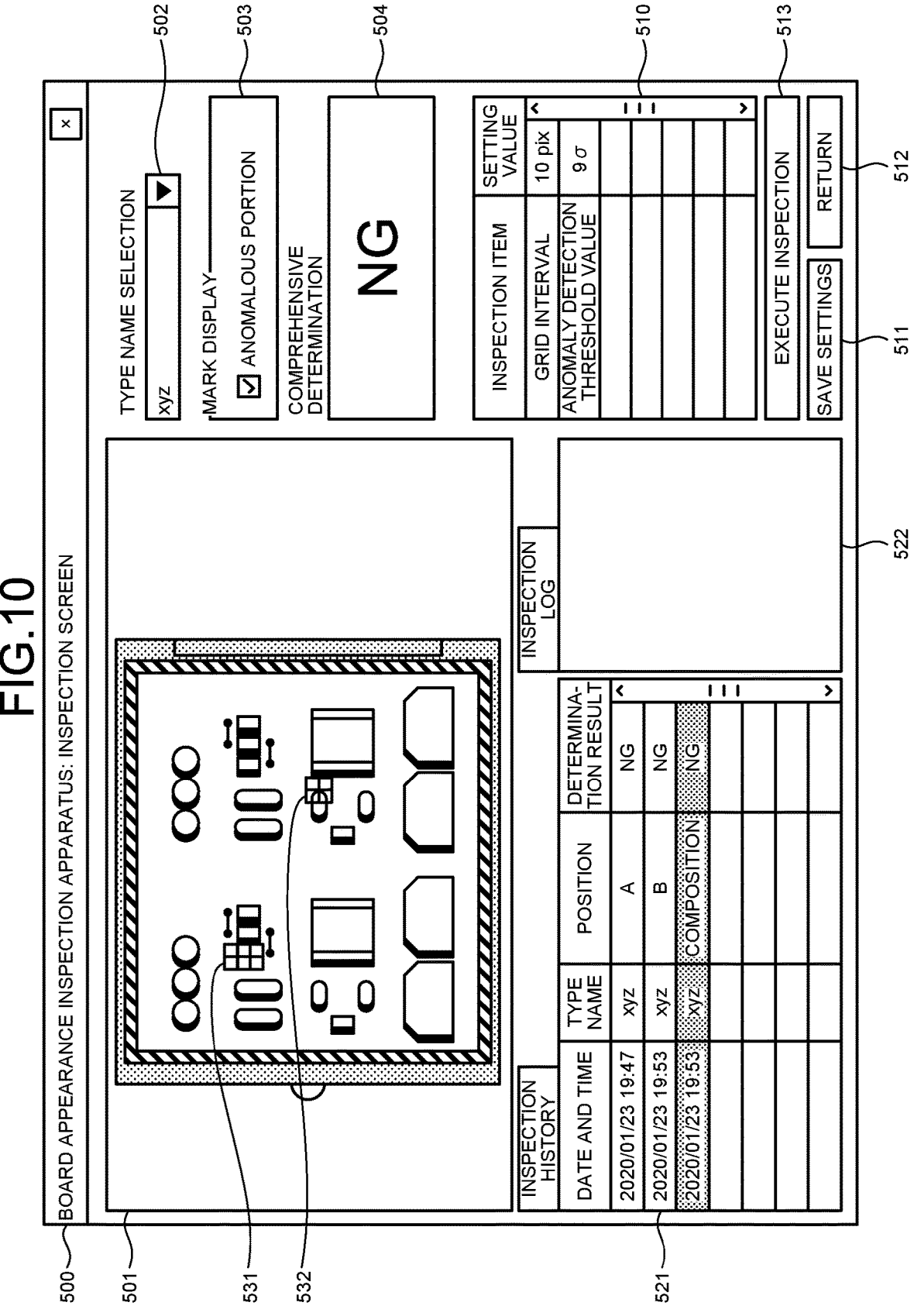
FIG. 10 is a diagram showing an example of the configuration of the inspection screen in the board appearance inspection apparatus according to the first embodiment.

FIGS. 8, 9, and 10 are diagrams showing examples of a configuration of the inspection screen in the board appearance inspection apparatus according to the first embodiment. FIG. 8 shows an example of the inspection screen 500 displaying a result image superimposed on an input image captured at the board position A, and FIG. 9 shows an example of the inspection screen 500 displaying a result image superimposed on an input image captured at the board position B. FIG. 10 shows an example of the inspection screen 500 displaying the result image of FIG. 8 and the result image of FIG. 9 superimposed on the input image of FIG. 8.

The inspection screen 500 is a screen on which, for example, an operation related to inspection is received, setting data related to inspection are edited, an instruction to perform inspection is issued, and a determination result from the determination unit 209, an input image, and a result image are displayed. The inspection screen 500 includes an image display field 501, a type name selection field 502, a mark display switching field 503, a comprehensive determination field 504, an inspection condition setting field 510, a setting saving button 511, a return button 512, an inspection execution button 513, an inspection history selection field 521, and an inspection log display field 522.

The image display field 501 is a display area that displays an input image from the determination unit 209, an image obtained by superimposition of a result image on the input image, or a composite result image that is an image obtained by superimposition of a result image generated for the board position A and a result image generated for the board position B on an input image captured at the board position A, according to the state of selection in the mark display switching field 503.

The type name selection field 502 is a field for selecting a type name of the board 150 to be inspected. In one example, the type name selection field 502 is formed as a combo box. Only type names for which learning has been completed on the learning screen 400 in advance are listed as selection items.

The mark display switching field 503 is a field for setting the switching between whether or not to display a mark of an anomalous portion in an input image displayed in the image display field 501. In one example, the mark display switching field 503 includes a check box. When the display of the mark of the anomalous portion is enabled, the screen display unit 210 displays an input image with a result image superimposed thereon in the image display field 501. At this time, the screen display unit 210 provides display according to the "position" of an item being selected in the inspection history selection field 521. When the "position" indicates the board position A, an input image captured at the board position A is displayed with a relevant result image superimposed thereon. When the "position" indicates the board position B, an input image captured at the board position B is displayed with a relevant result image superimposed thereon. When the "position" indicates composition, the input image captured at the board position A is displayed with the result image generated for the board position A and the result image generated for the board position B superimposed on the input image. At this time, the input image captured at the board position B may be used instead of the input image captured at the board position A. Furthermore, when the display of the mark of the anomalous portion is disabled, the screen display unit 210 displays only the input image in the image display field 501.

The comprehensive determination field 504 is a display area for displaying a determination result from the determination unit 209. In one example, when there is no problem with the mounting of the electronic components 152 on the board 150, the letters "OK" are displayed in the comprehensive determination field 504, and when there is a problem with the mounting of the electronic components 152 on the board 150, the letters "NG" are displayed in the comprehensive determination field 504. In one example, when at least one anomaly exists in the difference image, a determination result can be displayed as "NG".

The inspection condition setting field 510 is a table in which setting values can be edited for inspection condition setting items. When a type name is selected in the type name selection field 502, the screen display unit 210 reads setting data for inspection condition setting of the type name in the setting data storage unit 208, and displays the setting data in the inspection condition setting field 510.

The setting saving button 511 is a button for storing setting details of the inspection condition setting field 510 in the setting data storage unit 208 in response to a user's click.

The return button 512 is a button for switching the screen to be displayed to the initial screen 300 in response to a user's click.

The inspection execution button 513 is a button for issuing an instruction to execute inspection processing according to the details set in the inspection condition setting field 510, in response to a user's click.

The inspection history selection field 521 is a display area for displaying a history of execution of the inspection processing. In one example, the inspection history selection field 521 is formed as a list box. When a history item in the inspection history selection field 521 is selected, the screen display unit 210 displays details of the selected history item in the image display field 501, the type name selection field 502, the inspection condition setting field 510, and the inspection log display field 522.

The inspection log display field 522 is a display area for outputting any desired log data on execution of inspection processing. In one example, the inspection log display field 522 is formed as a text box.

In each of FIGS. 8 and 9, an image in which a result image is superimposed on an input image is displayed in the image display field 501. In FIG. 8, a result image including an anomalous portion 531 is superimposed on an input image and shown in the image display field 501. In FIG. 9, a result image including the anomalous portion 531 and an anomalous portion 532 is superimposed on an input image and shown in the image display field 501. The anomalous portion 532 is an example of an anomaly that is not detected in the input image captured at the board position A but is detected only in the input image captured at the board position B. In addition, an image including the input image to which the anomalous portions 531 and 532 obtained from the result image have been added may be displayed in the image display field 501. That is, an image including an anomalous region obtained from a result image just needs to be displayed in the image display field 501. In addition, FIG. 10 illustrates a combination o:f the result of FIG. 8 and the result of FIG. 9. In FIG. 10, a composite result image including the anomalous portion 531 illustrated in FIG. 8 and the anomalous portions 531 and 532 illustrated in FIG.

9 is shown in the image display field 501. In one example, the composite result image is an image obtained by superimposition of the result image generated for the board position A and the result image generated for the board position B on the input image captured at the board position A. Also in this case, an image including an input image to which the anomalous portions 531 and 532 obtained from all of a plurality of result images generated for a plurality of board positions, that is, the board positions A and B have been added may be displayed in the image display field 501. That is, a composite result image including anomalous regions obtained from result images generated for the plurality of board positions, that is, the board positions A and B just needs to be displayed in the image display field 501.

Figure 11:
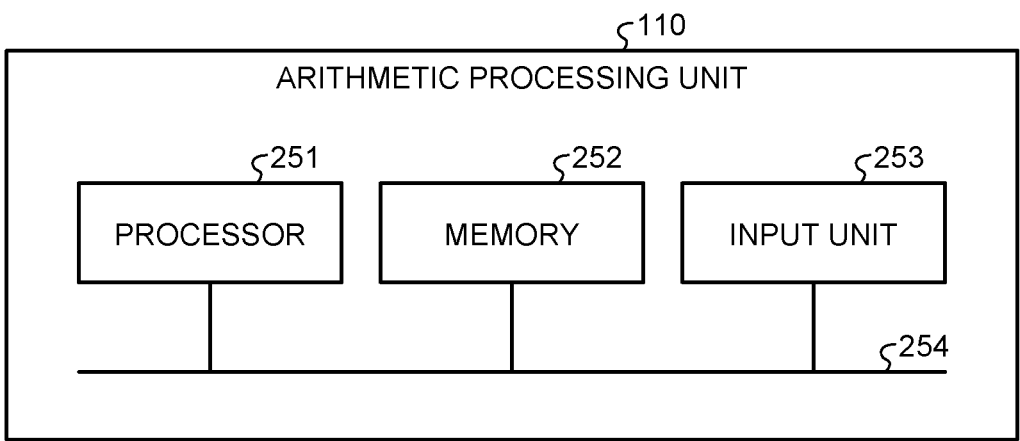
FIG. 11 is a block diagram schematically showing an example of a hardware configuration of an arithmetic processing unit, of the board appearance inspection apparatus according to the first embodiment.

Here, a hardware configuration of the above-described arithmetic processing unit 110 will be described. FIG. 11 is a block diagram schematically showing an example of a hardware configuration of the arithmetic processing unit of the board appearance inspection apparatus according to the first embodiment. The arithmetic processing unit 110 includes a computer including a processor 251, a memory 252, and an input unit 253. The processor 251 executes various processes. The memory 252 stores information. The input unit 253 is for inputting information according to a user operation. The processor 251, the memory 252, and the input unit 253 are connected by a bus line 254.

Examples of the processor 251 include a central processing unit (CPU, also referred to as a processing device, an arithmetic device, a microprocessor, a microcomputer, or a digital signal processor (DSP)) and a system large-scale integration (LSI). The memory 252 includes a random access memory (RAM), a read only memory (ROM), or an external storage device. A learning image capturing program, a model generation program, and a board appearance inspection program are loaded into the RAM, and data to be used by the processor 251 are temporarily held in the RAM. A procedure for capturing a learning image to be executed by the processor 251 is described in the learning image capturing program. A procedure for generating a model is described in the model generation program. The board appearance inspection program is for causing inspection to be performed by use of the appearance of the board 150. A Basic Input/Output System (BIOS) or Unified Extensible Firmware Interface (UEFI), which is a program for basic control of the computer serving as the arithmetic processing unit 110, is stored in the ROM. The external storage device is an HDD or SSD. The external storage device stores the learning image capturing program, the model generation program, the board appearance inspection program, learning images, learned models, and various data including setting data. Note that the learning image capturing program, the model generation program, and the board appearance inspection program may be stored in the ROM. Note that the board appearance inspection program is an example of an appearance inspection program.

The programs stored in the ROM and the external storage device are loaded into the RAM. The processor 251 loads the learning image capturing program, the model generation program, and the board appearance inspection program into the RAM, and executes various processes. In the first embodiment, the processor 251 executes the learning image capturing program, the model generation program, and the board appearance inspection program to implement the above-described function of each of the following processing units: the sensor input unit 200, the imaging control unit 201, the lighting control unit 202, the model generation unit 204, the reconstructed image generation unit 206, the image comparison unit 207, the determination unit 209, and the screen display unit 210.

The learning image capturing program, the model generation program, and the board appearance inspection program way be stored in a computer-readable storage medium. The arithmetic processing unit 110 may store, in the external storage device, the learning image capturing program, the model generation program, and the board appearance inspection program stored in the storage medium. The storage medium may be a portable storage medium which is a flexible disk, or a flash memory which is a semiconductor memory. The learning image capturing program, the model generation program, and the board appearance inspection program may be installed to the computer serving as the arithmetic processing unit 110 from another computer or a server device via a network.

An example of the input unit 253 is a keyboard or a mouse. Furthermore, the input unit 253 and the display unit 109 may be formed as a touch panel in which the display unit 109 and the input unit 253 are integrated.

Note that the arithmetic processing unit 110 may include a microcomputer board, a field-programmable gate array (FPGA) board, or the like instead of the computer.

Next, a description will be given of a board appearance inspection method to be performed in the board appearance inspection apparatus 100 according to the first embodiment. Hereinafter, a method of imaging a learning image, a learning method, and a board appearance inspection method will be sequentially described.

Figure 12:
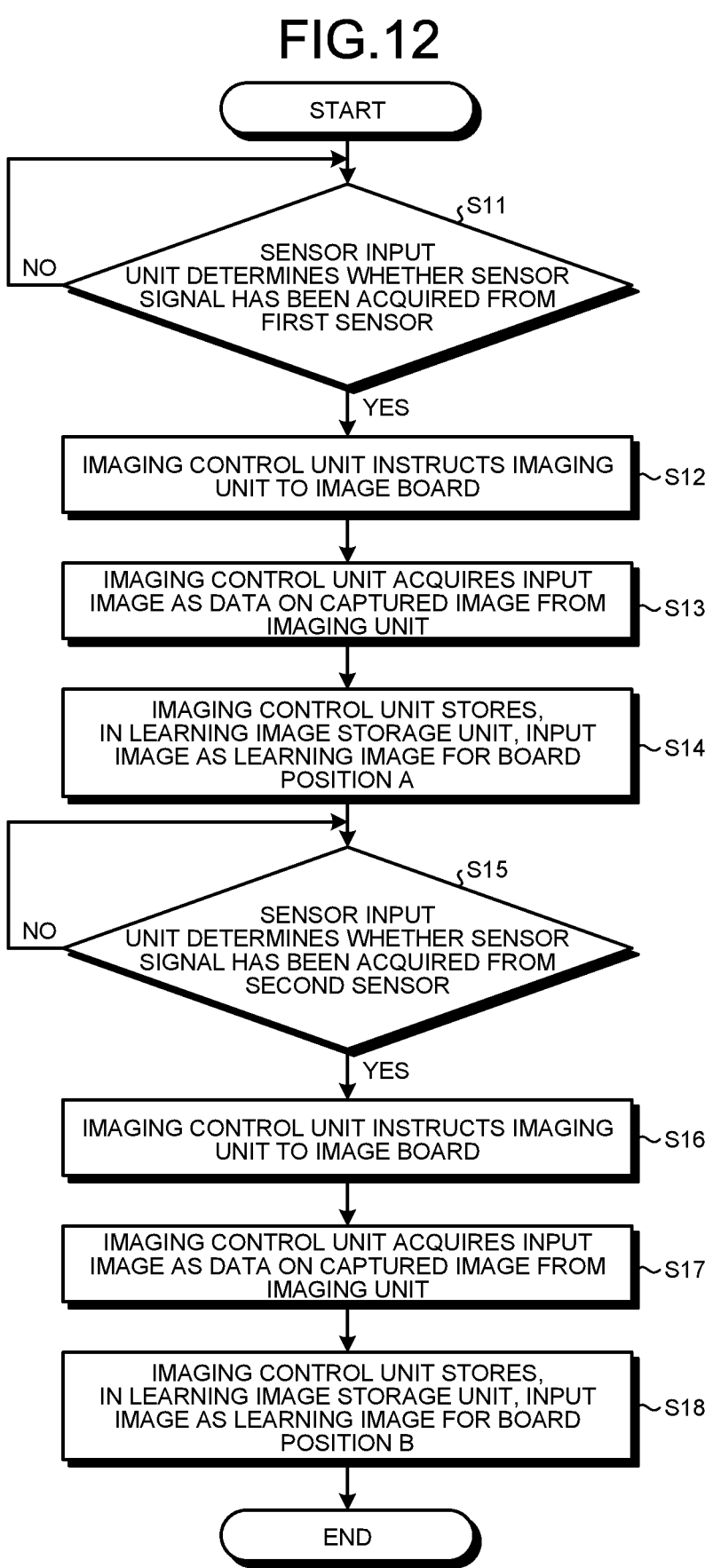
FIG. 12 is a flowchart showing an example of a processing procedure for an imaging method to be performed in the board appearance inspection apparatus according to the first embodiment.

FIG. 12 is a flowchart showing an example of a processing procedure for an imaging method to be performed in the board appearance inspection apparatus according to the first embodiment. This imaging method is performed when the user clicks the learning image capturing button 404 on the learning screen 400 of FIG. 6 or 7. In the following description, a type name being selected in the type name selection field 402 of the learning screen 400 is referred to as a target type name.

The board 150 for learning mounted on the board conveyance tray 160 is conveyed on the conveyance path by the board conveyance mechanism 106. The board 150 for learning is the board 150 having an appearance that is regarded as normal as a product in terms of the attachment states of the mounted electronic components 152 including an inclination or lift and the surface states of the mounted electronic components 152 including a scratch or foreign substance. Whether the attachment state and the surface state are normal or anomalous is determined in advance according to the intended use of the board 150 to be used. At this time, it is assumed that the board conveyance tray 160 is conveyed from a position on the conveyance path where the first sensor 108A is disposed to a position on the conveyance path where the second sensor 108B is disposed.

First, the sensor input unit 200 determines whether a sensor signal has been acquired from the first sensor 108A (step S11). In a case where no sensor signal has been acquired from the first sensor 108A (No in step S11), the sensor input unit 200 is kept in a standby state until a sensor signal is acquired from the first sensor 108A. Furthermore, in a case where a sensor signal has been acquired from the first sensor 108A (Yes in step S11), the sensor input unit 200 outputs a trigger signal to the imaging control unit 201, and causes the imaging control unit 201 to instruct the imaging unit 101 to image the board 150 that is an object (step S12).

Specifically, when a trigger signal is input from the sensor input unit 200, the imaging control unit 201 outputs, to the lighting control unit 202, a lighting control signal for instructing the lighting control unit 202 to prepare for the turn-on of the lighting apparatus 102. When the lighting control signal is input, the lighting control unit 202 outputs, to the lighting power supply 103, a turn-on control signal for controlling the turn-on state of the lighting apparatus 102. Upon receiving the turn-on control signal, the lighting power supply 103 turns on the lighting apparatus 102, and controls the lighting apparatus 102 so as to achieve brightness specified by the turn-on control signal. Furthermore, the imaging control unit 201 instructs the imaging unit 101 to perform imaging. As a result, the imaging unit 101 images the board 150 at the board position A.

Thereafter, the imaging control unit 201 acquires an input image as data on a captured image from the imaging unit 101 (step S13), and stores, in the learning image storage unit 203, the input image as a learning image for the board position A (step S14). Note that when storing a learning image, the imaging control unit 201 stores an input image as a learning image in a folder corresponding to a target type name selected on the learning screen 400. At this time, the learning image is associated with a board position. That is, the learning image is stored in the learning image storage unit 203 in association with the target type name and the board position. In addition, the screen display unit 210 adds the file name of the stored learning image to the learning image selection field 403 of the learning screen 400. In one example, a file name to be stored in the learning image storage unit 203 may be a combination of a serial number starting from "000001" and a symbol indicating a board position. In the example of the first embodiment, the symbol indicating a board position is defined as follows the symbol "A" denotes the board position A, and the symbol "B" denotes the board position B. In this manner, a learning image is uniquely identified according to a folder and a file name, and is associated with a target type name and a board position. A file name is assigned in the same manner also for the storage of a learning image to be described below. However, this is merely an example, and a file name may be created according to another rule. Alternatively, a learning image may be associated with a target type name and a board position.

Next, the sensor input unit 200 determines whether a sensor signal has been acquired from the second sensor 108B (step S15). In a case where no sensor signal has been acquired from the second sensor 108B (No in step S15), the sensor input unit 200 is kept in a standby state until a sensor signal is acquired from the second sensor 108B. Furthermore, in a case where a sensor signal has been acquired from the second sensor 108B (Yes in step S15), the sensor input unit 200 outputs a trigger signal to the imaging control unit 201, and causes the imaging control unit 201 to instruct the imaging unit 101 to image the board 150 step S16). A process from the reception of the trigger signal to the capturing of en image of the board 150 is performed in the same manner as in the case of imaging to be performed at the board position A.

Thereafter, the imaging control unit 201 acquires an input image as data on a captured image from the imaging unit 101 (step S17), and stores, in the learning image storage unit 203, the input image as a learning image for the board position B (step S18). Note that the learning image is stored in the learning image storage unit 203 in association with the target type name selected on the learning screen 400 and a board position. Thus, the process of capturing a learning image ends.

FIG. 13 is a flowchart showing an example of a processing procedure for a learning method to be performed in the board appearance inspection apparatus according to the first embodiment. The learning method is performed when the user clicks the learning execution button 413 on the learning screen 400 of FIG. 6 or 7.

First, the model generation unit 204 acquires learning images of the board position A from the learning image storage unit 203 (step S31). At this time, the model generation unit 204 acquires learning images of the board position A selected in the learning image selection field 403, with reference to a folder of the learning image storage unit 203 corresponding to the target type name in the type name selection field 402 of the learning screen 400.

Next, the model generation unit 204 learns the acquired learning images of the board position A, and generates a machine learning model to be used for generating a reconstructed image (step S32). When the learning of the learning images of the board position A is completed, the model generation unit 204 stores the generated machine learning model as a learned model of the board position A in a folder corresponding to the target type name in the learned model storage unit 205 (step S33). In addition, the screen display unit 210 adds history data regarding executed learning to the learning history display field 421 of the learning screen 400. Since the learning history display field 421 includes item names of a date and time, a type name, a position, and an evaluation value as illustrated in FIGS. 6 and 7, the screen display unit 210 displays history data including these items. The date and time refers to a date and time when learning is completed. The type name refers to the target type name selected in the type name selection field 402. The position indicates a board position of learning images used for learning. The evaluation value indicates a result of learning. Here, the position is assumed to be set to "A" indicating the board position A. In addition, although it is assumed that the score of a learning result is indicated as the evaluation value, the following evaluation value may be used, as another example. A plurality of image files to be used for inspection and multiple pieces of data on anomalous portions are prepared in advance, and there is used, as an evaluation value, a matching ratio of the anomalous portions obtained when generation of a reconstructed image, comparison of images, and determination in an inspection method to be described below are performed on the image files and the data. The same applies to an evaluation value to be described below.

Thereafter, the model generation unit 204 acquires learning images of the board position B from the learning image storage unit 203 (step S34). Here, it is assumed that the user has selected the learning images of the board position B in the learning image selection field 403 of the learning screen 400. The model generation unit 204 acquires the learning images of the board position B selected in the learning image selection field 403, with reference to a folder of the learning image storage unit 203 corresponding to the target type name in the type name selection field 402 of the learning screen 400.

Next, the model generation unit 204 learns the acquired learning images of the board position B, and generates a machine learning model to be used for generating a reconstructed image (step S35). When the learning of the learning images of the board position B is completed, the model generation unit 204 stores the generated machine learning model as a learned model of the board position B in the folder corresponding to the target type name in the learned model storage unit 205 (step S36). In addition, the screen display unit 210 adds history data regarding executed learning to the learning history display field 421 of the learning screen 400. Here, the position is assumed to be set to "B" indicating the board position B. Thus, the learning processing ends.

Figure 15:
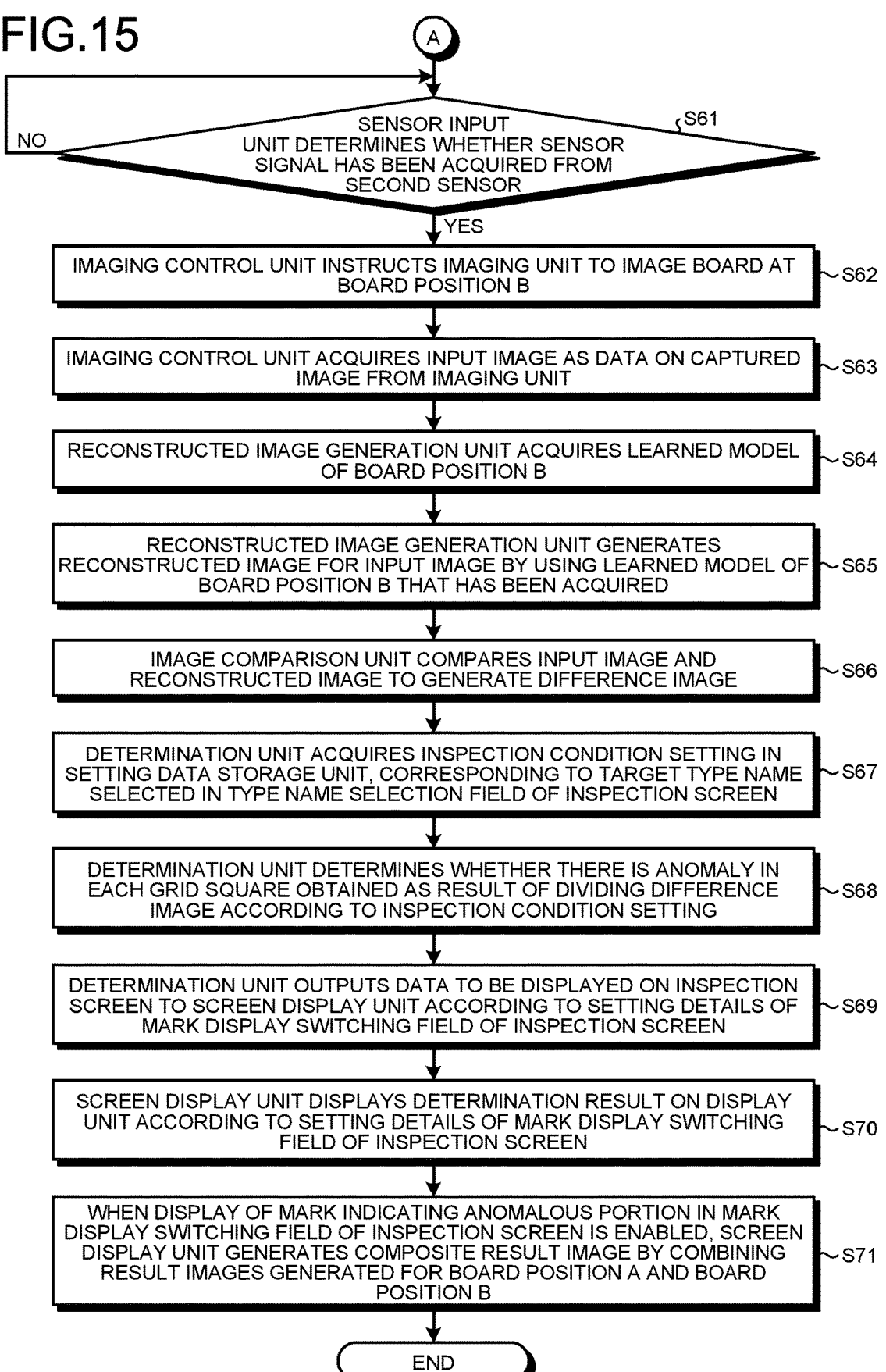
FIG. 15 is a flowchart showing the example of the processing procedure for: the board appearance inspection method to be performed in the board appearance inspection apparatus according to the first embodiment.

FIGS. 14 and 15 are flowcharts showing an example of a processing procedure for a board appearance inspection method to be performed in the board appearance inspection apparatus according to the first embodiment. This inspection method is performed when the user clicks the inspection execution button 513 on the inspection screen 500 of FIG. 8, 9, or 10. Furthermore, the board 150 to be inspected, mounted on the board conveyance tray 160 is conveyed on the conveyance path by the board conveyance mechanism 106. Here, it is also assumed that the board conveyance tray 160 is conveyed from the position on the conveyance path where the first sensor 108A is disposed to the position on the conveyance path where the second sensor 108B is disposed. In the following description, a type name being selected in the type name selection field 502 of the inspection screen 500 is referred to as a target type name.

First, the sensor input unit 200 determines whether a sensor signal has been acquired from the first sensor 108A (step S51). In a case where no sensor signal has been acquired from the first sensor 108A (No in step S51), the sensor input unit 200 is kept in a standby state until a sensor signal is acquired from the first sensor 108A. Furthermore, in a case where a sensor signal has been acquired from the first sensor 108A (Yes in step S51), the sensor input unit 200 outputs a trigger signal to the imaging control unit 201, and causes the imaging control unit 201 to instruct, the imaging unit 101 to image the board 150 at the board position A (step S52). The board 150 is imaged according to the same procedure as that described in step S12 of FIG. 12.

Thereafter, the imaging control unit 201 acquires an input image as data on a captured image from the imaging unit 101 (step S53), and outputs the input image captured at the board position A to the reconstructed image generation unit 206, the image comparison unit 207, and the determination unit 209.

Next, the reconstructed image generation unit 206 acquires the learned model of the board position A with reference to a folder in the learned model storage unit 205 corresponding to a target type name selected in the type name selection field 502 of the inspection screen 500 (step S54). Thereafter, the reconstructed image generation unit 206 generates a reconstructed image for the input image by using the learned model of the board position A that has been acquired (step S55). The learned model is a model to be used for attempting to reproduce image data on a learning target object, and is a model for reconstructing, from the image data, an image for use in inferring the anomalous portions 531 and 532. The reconstructed image generation unit 206 outputs the reconstructed image that has been generated to the image comparison unit 207.

Next, when the input image and the reconstructed image are input, the image comparison unit 207 compares the input image and the reconstructed image to generate a difference image (step S56). The image comparison unit 207 outputs the generated difference image to the determination unit 209.

When the difference image is input, the determination unit 209 acquires an inspection condition setting in the setting data storage unit 208, corresponding to the target type name selected in the type name selection field 502 of the inspection screen 500 (step S57). The inspection condition setting includes a grid interval and an anomaly detection threshold value. Then, the determination unit. 209 determines whether there is an anomaly in each grid square obtained as a result of dividing the difference image according to the inspection condition setting (step S58). In one example, the determination unit 209 obtains the standard deviation or variance of pixel values of pixels included in each grid square, and compares the standard deviation or variance of the grid square with an anomaly detection threshold value, so that it is determined whether there is an anomaly in each grid square.

The determination unit 209 outputs data to be displayed on the inspection screen 500 to the screen display unit 210 according to the setting details of the mark display switching field 503 of the inspection screen 500 (step S59). Specifically, when the display of the mark indicating an anomalous portion in the mark display switching field 503 is disabled on the inspection screen 500, the determination unit 209 passes the input image and the determination result to the screen display unit 210. Furthermore, when the display of the mark indicating an anomalous portion in the mark display switching field 503 is enabled on the inspection screen 500, the determination unit 209 generates a result image in which the difference image is shown as a transparent image except for the anomalous portions 531 and 532, and passes the input image, the result image, and the determination result to the screen display unit 210.

The screen display unit 210 displays the determination result on the display unit 109 according to the setting details of the mark display switching field 503 of the inspection screen 500 (step S60). Specifically, when the display of the mark indicating an anomalous portion in the mark display switching field 503 is disabled on the inspection screen 500, the screen display unit 210 displays the input, image in the image display field 501, and displays the determination result in the comprehensive determination field 504. In addition, when the display of the mark indicating an anomalous portion in the mark display switching field 503 is enabled on the inspection screen 500, the screen display unit 210 displays the input image with the result image superimposed thereon in the image display field 501, and displays the determination result in the comprehensive determination field 504. Furthermore, the screen display unit 210 adds history data to the inspection history selection field 521. In one example, the screen display unit 210 displays, in the inspection history selection field 521, history data including details of each item of a date and time of completion of inspection, a type name, a position, and a determination result. Here, the position is set to "A" indicating the board position A.

Thereafter, the sensor input unit 200 determines whether a sensor signal has been acquired from the second sensor 108B (step S61). In a case where no sensor signal has been acquired from the second sensor 108B (No in step S61), the sensor input unit 200 is kept in a standby state until a sensor signal is acquired from the second sensor 108B. Furthermore, in a case where a sensor signal has been acquired from the second sensor 108B (Yes in step S61), the sensor input unit 200 outputs a trigger signal to the imaging control unit 201, and causes the imaging control unit 201 to instruct the imaging unit 101 to image the board 150 at the board position B (step S62). The board 150 is imaged according to the same procedure as that described in step S12 of FIG. 12.

Thereafter the imaging control unit 201 acquires an input image as data on a captured image from the imaging unit 101 step S63), and outputs the input image captured at the board position B to the reconstructed image generation unit 206, the image comparison unit 207, and the determination unit 209.

Next, the reconstructed image generation unit 206 acquires the learned model of the board position B with reference to the folder in the learned model storage unit 205 corresponding to the target type name selected in the type name selection field 502 of the inspection screen 500 (step S64). Thereafter, the reconstructed image generation unit 206 generates a reconstructed image for the input image by using the learned model of the board position B that has been acquired (step S65). The reconstructed image generation unit 206 outputs the reconstructed image that has been generated to the image comparison unit 207.

Next, when the input image and the reconstructed image are input, the image comparison unit 207 compares the input image and the reconstructed image to generate a difference image (step S66). The image comparison unit 207 outputs the generated difference image to the determination unit 209.

When the difference image is input, the determination unit 209 acquires the inspection condition setting in the setting data storage unit 208, corresponding to the target type name selected in the type name selection field 502 of the inspection screen 500 (step S67). The inspection condition setting includes a grid interval and an anomaly detection threshold value. Then, the determination unit 209 determines whether there is an anomaly in each grid square obtained as a result of dividing the difference image according to the inspection condition setting (step S68). The determination method is the same as that described in step S58.

The determination unit 209 outputs data to be displayed on the inspection screen 500 to the screen display unit 210 according to the setting details of the mark display switching field 503 of the inspection screen 500 (step S69). The processing here is the same as that described in step S59.

The screen display unit 210 displays the determination result on the display unit 109 according to the setting details of the mark display switching field 503 of the inspection screen 500 (step S70). A method of displaying the determination result is the same as that described in step S60. Furthermore, the screen display unit 210 adds history item data to the inspection history selection field 521. In one example, the screen display unit 210 displays, in the inspection history selection field 521, history data including the date and time of completion of inspection, the type name, the position, and the determination result. Here, the position is set to "B" indicating the board position B.

Thereafter, when the display of the mark indicating the anomalous portion in the mark display switching field 503 of the inspection screen 500 is enabled, the screen display unit 210 generates a composite result image by combining result images generated for the board position A and the board position B (step S71). In one example, the screen display unit 210 displays the input image captured at the board position A with the result images generated for the board position A and the board position B superimposed on the input image. The screen display unit 210 adds history data related to the composite result image to the inspection history selection field 521. In one example, the screen display unit 210 displays, in the inspection history selection field 521, history data including the date and time of completion of inspection, the type name, the position, and the determination result. Here, the position is set to "composition", where the result of the board position A is combined with the result of the board position B.

FIG. 10 illustrates the result images generated for the board position A and the board position B superimposed on the input image. As illustrated in FIG. 8, the single anomalous portion 531 has been detected at the board position A. Meanwhile, at the board position B, the two anomalous portions 531 and 532 have been detected as illustrated in FIG. 9. As a result, the two anomalous portions 531 and 532 are shown in the composite result image obtained as a result of combination of these images, as illustrated in FIG. 10. As described above when the same board 150 is imaged only at a single position, a difference due to an anomaly in an attachment state including an inclination or lift and an anomaly in a surface state including a scratch or foreign substance may be less likely to appear in an image. In particular, it is difficult to detect a component or the like in which a lift occurs on an axis of the imaging unit 101 in an imaging direction. Therefore, the board 150 is imaged from a plurality of points so that determination can be made after results of the imaging are combined. This achieves the effect of enabling an increase in the range of detection of an anomaly in the attachment state and the surface state. Note that, as a method of imaging the board 150 from a plurality of points, it is conceivable that a plurality of the imaging units 101 is simply installed, but this method causes an increase in equipment cost. It is possible to achieve the effect of reducing equipment cost by detecting the position of the board 150 by means of the first sensor 108A and the second sensor 108B and capturing images at a plurality of board positions by use of the single imaging unit 101, as in the first embodiment. Note that the case where the two sensors 108A and 108B are disposed on the conveyance path has been described in the above example, but a single sensor may be disposed on the conveyance path, and alternatively, three or more sensors may be disposed on the conveyance path. Thus, the process ends.

In the first embodiment, a plurality of the sensors 108A and 108B for detecting the board 150 being conveyed is provided at different positions on the conveyance path. In addition, the imaging unit 101 is installed above the conveyance path, and images the board 150 that has reached the respective positions of the sensors 108A and 108B. In addition, the model generation unit 204 generates a model for generating a reconstructed image that is an image to be obtained by reproduction of an input image that is a captured image of the board 150 to be inspected, by learning captured learning images of the board 150 on which a component is mounted with no anomaly in an attachment state including a lift or inclination and in a surface state including a scratch or foreign substance, that is, the board 150 having an appearance that is regarded as normal as a product. The reconstructed image generation unit 206 generates a reconstructed image from an input image obtained by the imaging of the board 150 to be inspected, according to the model. The image comparison unit 207 obtains a difference image corresponding to a difference between the reconstructed image and the input image. The determination unit 209 determines whether there is an anomaly in the attachment state and the surface state by using the statistic of pixel values of pixels included in a grid square provided in the difference image, and displays the result on the display unit 109. This achieves the effect of enabling inspection for an anomaly in the attachment states of the electronic components 152 mounted on the board 150 or the surface state of the board 150 simply by imaging the component surface of the board 150 without imaging the solder surface of the board 150. That is, since the solder surface of the board 150 is not imaged, it is not necessary to provide a step of reversing the board 150 for inspection in a board conveyance line for manufacturing the board 150 including the electronic components 152. As a result, the board appearance inspection apparatus 100 according to the first embodiment can be introduced into en existing board conveyance line.

Furthermore, in the first embodiment, since the determination unit 209 performs determination by providing a grid in a difference image, it is possible to specify an anomalous region in units of grid squares. Moreover, the determination unit 209 uses standard deviation or variance as a statistic of pixel values of pixels included in a grid square. As a result, erroneous detection can be prevented. In addition, the board 150 to be inspected that has reached a plurality of positions on the conveyance path is imaged by the single imaging unit 101, and determination is made by use of an input image captured at each of the positions. Using the input images of the board 150 captured at the plurality of positions allows a range where it is difficult to see the attachment state or surface state from an input image captured at a certain position to be covered by an input image captured at another position, so that it is possible to improve the capability of detecting an anomaly in the attachment state or surface state.

Furthermore, it is possible to reduce the amount of information on the input image by using, as en input image, a difference between an image of the board 150 on which the electronic components 152 are not mounted and an image of the board 150 to be inspected on which the electronic components 152 are mounted, so that learning for generating a model can be efficiently performed.

Note that inspection of the appearance of the board 150 with the electronic components 152 mounted thereon has been described as an example in the above description, but an object of the appearance inspection apparatus and the appearance inspection method is not: limited to the board 150. In one example, the appearance inspection apparatus and the appearance inspection method may be applied to inspection of objects such as a component, such as the electronic component 152, a product manufactured by being processed, and a product including a plurality of parts having been assembled. In addition, as another example, a surface of a coated product or a product manufactured by resin molding may be inspected for voids, chips, cracks, burrs, or the like. In this case, an anomalous portion such as a scratch or foreign substance on an object is detected by use of the appearance inspection apparatus and the appearance inspection method.

The configurations set forth in the above embodiment show examples, and it is possible to combine the configurations with another technique that is publicly known, and is also possible to partially omit or change the configurations without departing from the scope of the present disclosure.

REFERENCE SIGNS LIST

100 board appearance inspection apparatus; 101 imaging unit; 102 lighting apparatus; 103 lighting power supply; 104 shading cover; 105 board conveyance unit; 106 board conveyance mechanism; 107 board conveyance mechanism frame; 108A first sensor; 108B second sensor; 109 display unit; 110 arithmetic processing unit; 131 imaging unit connection cable; 132 lighting power supply control cable; 133 lighting power supply cable; 134 sensor connection cable; 135 display connection cable; 150 board; 151 circuit substrate; 152 electronic component; 160 board conveyance tray; 200 sensor input unit; 201 imaging control unit; 202 lighting control unit; 203 learning image storage unit; 204 model generation unit; 205 learned model storage unit; 206 reconstructed image generation unit; 207 image comparison unit; 208 setting data storage unit; 209 determination unit; 210 screen display unit.

The invention claimed is:

1. An appearance inspection apparatus comprising:
a plurality of sensors to detect an object at a plurality of different positions in a conveyance mechanism for conveying the object;
an imager to image the object at each of the plurality of different positions;
the imager images at least a same portion of the object when the object is detected by each of the plurality of sensors at corresponding one of the plurality of different positions;
a reconstructed image generation circuitry to generate a reconstructed image by using a model, the reconstructed image being an image to be obtained by reconstruction of an input image, image data on the object imaged by the imager being used as the input image, the model being used for attempting to reproduce the image data;
an image comparison circuitry to generate a difference image corresponding to a difference between the input image and the reconstructed image for each of the input images, which are detected at the plurality of different positions in the conveyance mechanism for conveying the object;
a determination circuitry to divide the difference image into a plurality of regions, and determine an anomalous region based on a statistic calculated for each of the regions; and
a screen display to display, on a display, a composite result image in which result images at each of the plurality of different positions are superimposed on one of the input images at the plurality of different positions and an anomaly result image obtained by extraction of an anomalous portion from the difference image for the plurality of different difference images.

2. The appearance inspection apparatus according to claim 1, wherein the determination circuitry calculates, as the statistic, a variance or a standard deviation of pixel values of pixels included in the region.

3. The appearance inspection apparatus according to claim 1, further comprising:
an imaging control circuitry to output, as the input image, an image obtained by application of affine transformation or projective transformation to the image data on the object imaged by the imager.

4. The appearance inspection apparatus according to claim 1, wherein the object is an electronic circuit board, and the appearance inspection apparatus learns the model for generating the reconstructed image as input data, a difference between image data on the electronic circuit board on which no component is mounted and image data on a surface of the electronic circuit board on which the component is mounted.

5. The appearance inspection apparatus according to claim 1, wherein the anomaly result image obtained by the extraction of the anomalous portion from the difference image for the plurality of different difference images is superimposed on the composite result image.

6. An appearance inspection apparatus according to claim 1, further comprising:
a model generation circuitry to generate the model for generating a reconstructed image, wherein
the object is an electronic circuit board, and the model generation circuitry learns the model by using, as the input data, a difference between image data on the electronic circuit board on which no component is mounted and image data on a surface of the electronic circuit board on which the component is mounted.

7. The appearance inspection apparatus according to claim 6, wherein
the object is conveyed on a conveyance path with a surface on which a component is mounted facing upward, and
the imager is disposed above the conveyance path in such a way as to image the conveyance path.

8. An appearance inspection method comprising:
causing an imager to image at least a same portion of an object at a plurality of different positions in a conveyance mechanism for conveying the object;
causing an arithmetic processing circuitry to generate a reconstructed image by using a model, the reconstructed image being an image to be obtained by reconstruction of an input image, image data on the object imaged by the imager being used as the input image, the model being used for attempting to reproduce the image data;
causing the arithmetic processing circuitry to generate a difference image corresponding to a difference between the input image and the reconstructed image for each of the input images, which are detected at the plurality of different positions in the conveyance mechanism for conveying the object;
causing the arithmetic processing circuitry to divide the difference image into a plurality of regions, and determine an anomalous region based on a statistic calculated for each of the regions; and
causing a screen display to display, on a display, a composite result image in which result images at each of the plurality of different positions are superimposed on one of the input images at the plurality of different positions and an anomaly result image obtained by extraction of an anomalous portion from the difference image for the plurality of different difference images.

9. The appearance inspection method according to claim 8, further comprising:
causing the arithmetic processing circuitry to calculate, as the statistic, a variance or a standard deviation of pixel values of pixels included in the region.

10. The appearance inspection method according to claim 8, further comprising:
causing the arithmetic processing circuitry to output, as the input image, an image obtained by application of affine transformation or projective transformation to the image data on the object imaged by the imager.

11. The appearance inspection method according to claim 8, wherein the object is an electronic circuit board, and the appearance inspection apparatus learns the model for generating the reconstructed image as input data, a difference between image data on the electronic circuit board on which no component is mounted and image data on a surface of the electronic circuit board on which the component is mounted.

12. The appearance inspection method according to claim 8, further comprising:
causing model generating circuitry to generate the model for generating a reconstructed image, wherein the object is an electronic circuit board; and
causing the model generating circuitry to learn the model by using, as the input data, a difference between image data on the electronic circuit board on which no component is mounted and image data on a surface of the electronic circuit board on which the component is mounted.

13. The appearance inspection method according to claim 8, further comprising:

conveying the object on a conveyance path with a surface on which a component is mounted facing upward, and disposing the imager above the conveyance path in such a way as to image the conveyance path.

14. The appearance inspection method according to claim 8, further comprising:

superimposing the anomaly result image obtained by the extraction of the anomalous portion from the difference image for the plurality of different difference images on the composite result image.

* * * * *